(12) United States Patent
Mahdi et al.

(10) Patent No.: US 8,687,587 B2
(45) Date of Patent: Apr. 1, 2014

(54) INTER-SUBSYSTEM TRANSFERS

(75) Inventors: Kaniz Mahdi, Carrollton, TX (US);
Saso Stojanovski, Paris (FR); Mark Stegall, Melissa, TX (US)

(73) Assignee: Apple Inc., Cupertino, CA (US)

( * ) Notice: Subject to any disclaimer, the term of this patent is extended or adjusted under 35 U.S.C. 154(b) by 1089 days.

(21) Appl. No.: 12/304,460

(22) PCT Filed: Jun. 8, 2007

(86) PCT No.: PCT/IB2007/001549
§ 371 (c)(1),
(2), (4) Date: Dec. 11, 2008

(87) PCT Pub. No.: WO2007/144732
PCT Pub. Date: Dec. 21, 2007

(65) Prior Publication Data
US 2009/0207807 A1    Aug. 20, 2009

Related U.S. Application Data

(60) Provisional application No. 60/813,492, filed on Jun. 14, 2006, provisional application No. 60/878,965, filed on Jan. 5, 2007, provisional application No. 60/888,676, filed on Feb. 7, 2007, provisional application No. 60/893,253, filed on Mar. 6, 2007.

(51) Int. Cl.
*H04W 4/00*    (2009.01)
(52) U.S. Cl.
USPC ............................. 370/331; 370/329; 370/332
(58) Field of Classification Search
USPC ........................................................ 370/331
See application file for complete search history.

(56) References Cited

U.S. PATENT DOCUMENTS

| | | |
|---|---|---|
| 6,067,453 A | 5/2000 | Adiwoso et al. |
| 6,208,627 B1 | 3/2001 | Menon et al. |
| 6,721,565 B1 | 4/2004 | Ejzak et al. |
| 6,871,070 B2 | 3/2005 | Ejzak |
| 6,954,654 B2 | 10/2005 | Ejzak |
| 6,961,774 B1 | 11/2005 | Shannon et al. |
| 6,996,087 B2 | 2/2006 | Ejzak |
| 2003/0027569 A1 | 2/2003 | Ejzak |
| 2003/0174688 A1 | 9/2003 | Ahmed et al. |
| 2004/0002335 A1 | 1/2004 | Pan et al. |

(Continued)

FOREIGN PATENT DOCUMENTS

| | | | |
|---|---|---|---|
| GB | 2441166 A * | 2/2008 | ............... H04L 1/18 |
| WO | 0103450 A1 | 1/2001 | |
| WO | WO2004019173 A2 | 3/2004 | |
| WO | WO2006005989 A1 | 1/2006 | |

OTHER PUBLICATIONS

International Search Report for PCT/IB2006/001564 mailed Nov. 14, 2006.

(Continued)

*Primary Examiner* — Shripal Khajuria

(57) ABSTRACT

In general, the present invention provides for a direct inter-subsystem transfer of an active communication session, such as a call, between a packet subsystem (PS) and a circuit-switched subsystem (CS) in an efficient and effective manner while maintaining service control and continuity. Further, the inter-subsystem transfer may take place between a PS of one generation and a CS of another generation.

36 Claims, 23 Drawing Sheets

(56) References Cited

U.S. PATENT DOCUMENTS

| | | |
|---|---|---|
| 2004/0176084 A1 | 9/2004 | Verma et al. |
| 2004/0246990 A1 | 12/2004 | Krishnamurthi et al. |
| 2004/0249887 A1 | 12/2004 | Garcia-Martin et al. |
| 2005/0002407 A1 | 1/2005 | Shaheen et al. |
| 2005/0003797 A1 | 1/2005 | Baldwin |
| 2005/0025047 A1 | 2/2005 | Bodin et al. |
| 2005/0286531 A1 | 12/2005 | Tuohino et al. |
| 2006/0002355 A1 | 1/2006 | Baek et al. |
| 2006/0072549 A1 | 4/2006 | Goldman et al. |
| 2006/0083199 A1 | 4/2006 | Yang |
| 2006/0105770 A1 | 5/2006 | Jagadeesan et al. |
| 2006/0209805 A1 | 9/2006 | Mahdi et al. |
| 2006/0268781 A1 | 11/2006 | Svensson et al. |
| 2006/0280169 A1 | 12/2006 | Mahdi |
| 2006/0285537 A1 | 12/2006 | Mahdi |
| 2007/0004415 A1 | 1/2007 | Abedi |
| 2007/0014281 A1 | 1/2007 | Kant |
| 2007/0041367 A1 | 2/2007 | Mahdi |
| 2007/0058788 A1 | 3/2007 | Mahdi et al. |
| 2007/0100981 A1 | 5/2007 | Adamczyk et al. |
| 2007/0149166 A1 | 6/2007 | Turcotte et al. |
| 2007/0287459 A1* | 12/2007 | Diachina et al. .............. 455/436 |
| 2008/0025263 A1 | 1/2008 | Pelkonen |
| 2008/0056236 A1 | 3/2008 | Barclay et al. |

OTHER PUBLICATIONS

International Search Report for PCT/IB2006/002282 mailed Feb. 2, 2007.

International Search Report for PCT/IB2007/001555 mailed on Jan. 16, 2008.

International Search Report for PCT/IB2007/001549 mailed on Dec. 7, 2007.

"3GPP TS 23.167 V7.0.0," Technical Specification Release 7, Mar. 2006, 28 pages.

GSM, "3GPP TS 23.206 V.0.4.0," Technical Specification, Release 7, Apr. 2006, 28 pages.

International Search Report for PCT/IB2007/002954 mailed Mar. 3, 2011, 3 pages.

* cited by examiner

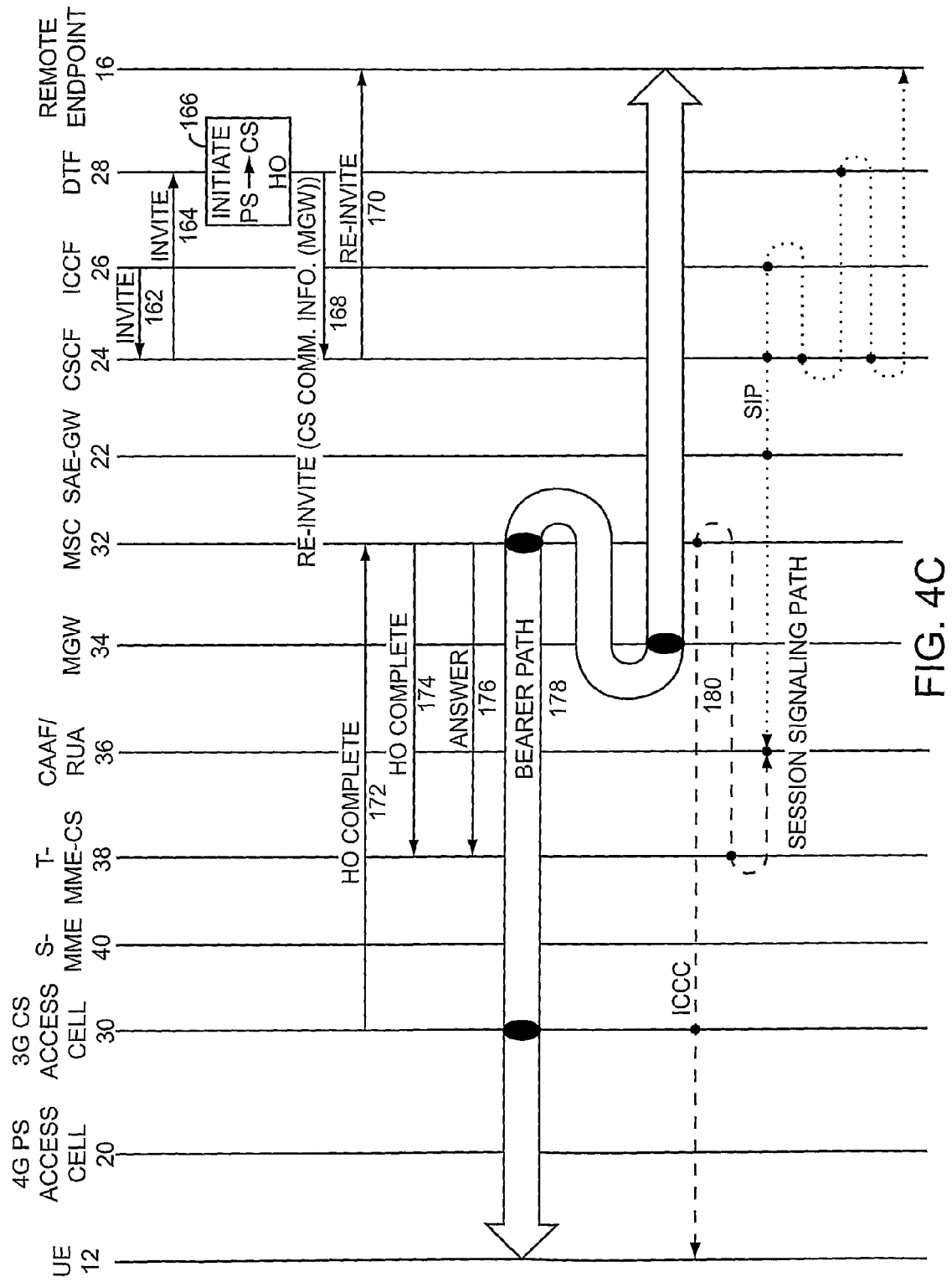

INTER-SUBSYSTEM TRANSFERS

CROSS-REFERENCE TO RELATED APPLICATIONS

This application is related to concurrently filed U.S. application Ser. No. 12/304,458, entitled METHOD FOR TRANSITIONING SUPPORT OF COMMUNICATION SESSIONS FOR A USER ELEMENT BETWEEN DIFFERENT TYPES OF SUBSYSTEMS OF DIFFERENT GENERATIONS.

This application is a 35 U.S.C. National Phase application based on PCT/IB2007/001549, which claims the benefit of U.S. provisional patent application Ser. No. 60/813,492 filed Jun. 14, 2006, U.S. provisional patent application Ser. No. 60/878,965 filed Jan. 5, 2007, U.S. provisional patent application Ser. No. 60/888,676 filed Feb. 7, 2007, and U.S. provisional patent application Ser. No. 60/893,253 filed Mar. 6, 2007, the disclosures of which are incorporated herein by reference in their entireties.

FIELD OF THE INVENTION

The present invention relates to cellular communications, and in particular to facilitating transitions between access networks of different generations and residing in different types of subsystems.

BACKGROUND OF THE INVENTION

Wireless communications technology is rapidly evolving to address the ever-increasing need for additional bandwidth and services. With each generation of wireless communication standards, the available bandwidth and services that are made available to subscribers have dramatically increased. Unfortunately, each generation of wireless communication standards generally requires additional network infrastructure and compatible user elements. In many instances, the network infrastructure of a new generation does not support that of an earlier generation. Further, different networks and generations thereof handle voice and data in different ways. For example, second generation (2G) networks rely heavily on circuit-switched communications for voice and data, while many third generation (3G) networks provide circuit-switched subsystems as well as packet-based subsystems for voice and data, respectively. Upcoming fourth generation (4G) networks may use packet-based subsystems for voice and data with little or no reliance on a circuit-switched subsystem.

In many environments, different types of subsystems and different generations of networks are available to a user element. Many user elements are able to support services on these different subsystems and different generations of these subsystems. However, transitioning from a packet subsystem of one generation to a circuit-switched subsystem of another generation, and vice versa, has proven to be cumbersome. Accordingly, there is a need for technique to efficiently and effectively transition support of communication sessions for a user element between different types of subsystems of different generations in an effective and efficient manner.

SUMMARY OF THE INVENTION

In general, the present invention provides for a direct inter-subsystem transfer of an active communication session, such as a call, between a packet subsystem (PS) and a circuit-switched subsystem (CS) in an efficient and effective manner while maintaining service control and continuity. Further, the inter-subsystem transfer may take place between a PS of one generation and a CS of another generation. A user element is able to support communications via the PS and CS through PS access and CS access networks, respectively. Application layer service control for a communication session is anchored in a multimedia subsystem (MS), such as an Internet Protocol MS (IMS), regardless of whether the user element is being served by the PS or CS. When the user element transitions between the PS and CS, the state of the communication session is maintained in the MS across the inter-subsystem transfer. For an inter-subsystem transfer between the PS and CS, a radio layer handover supports the transition of radio access for the user element from one subsystem to another. To maintain service control across the transfer, the MS provides an application layer transfer to maintain a session signaling path for session signaling between the user element and a remote endpoint. The state of the communication session before the transfer is maintained after the transfer by the MS.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 4A:
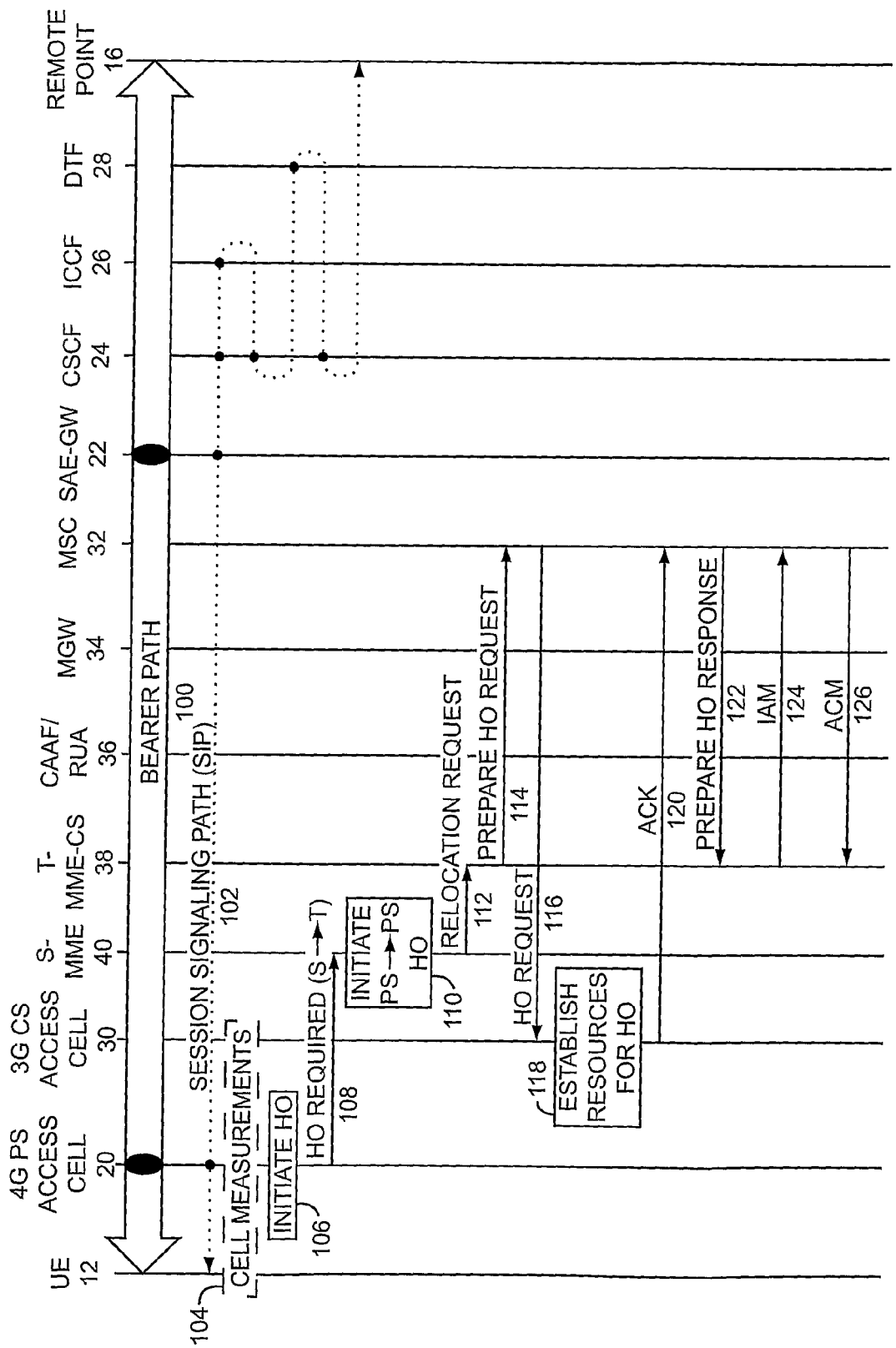
Figure 4B:
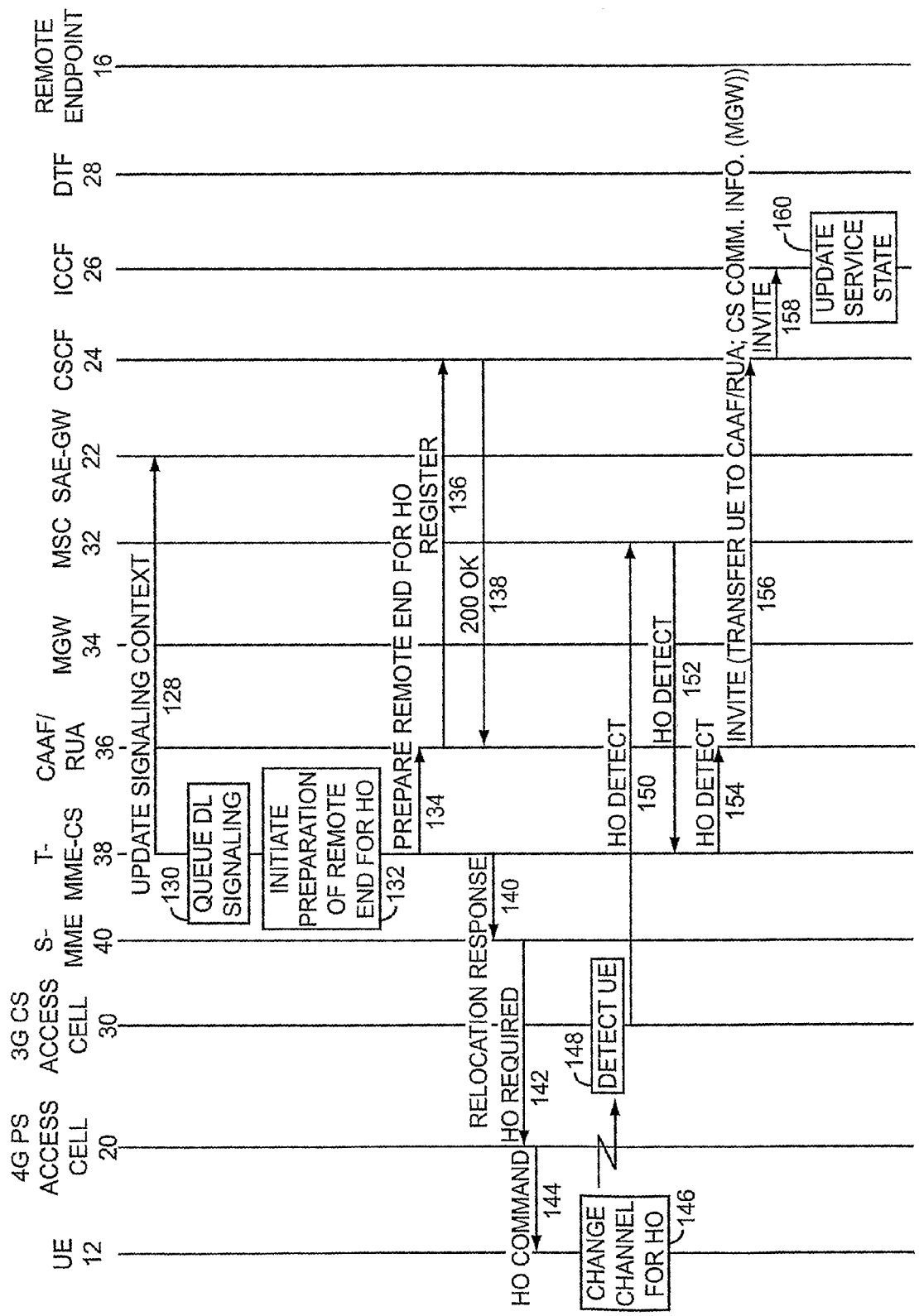

FIGS. 4A-4C provide a communication flow for an inter-subsystem transfer from a PS access cell to a CS access cell according to the first embodiment of the present invention.

Figure 5:
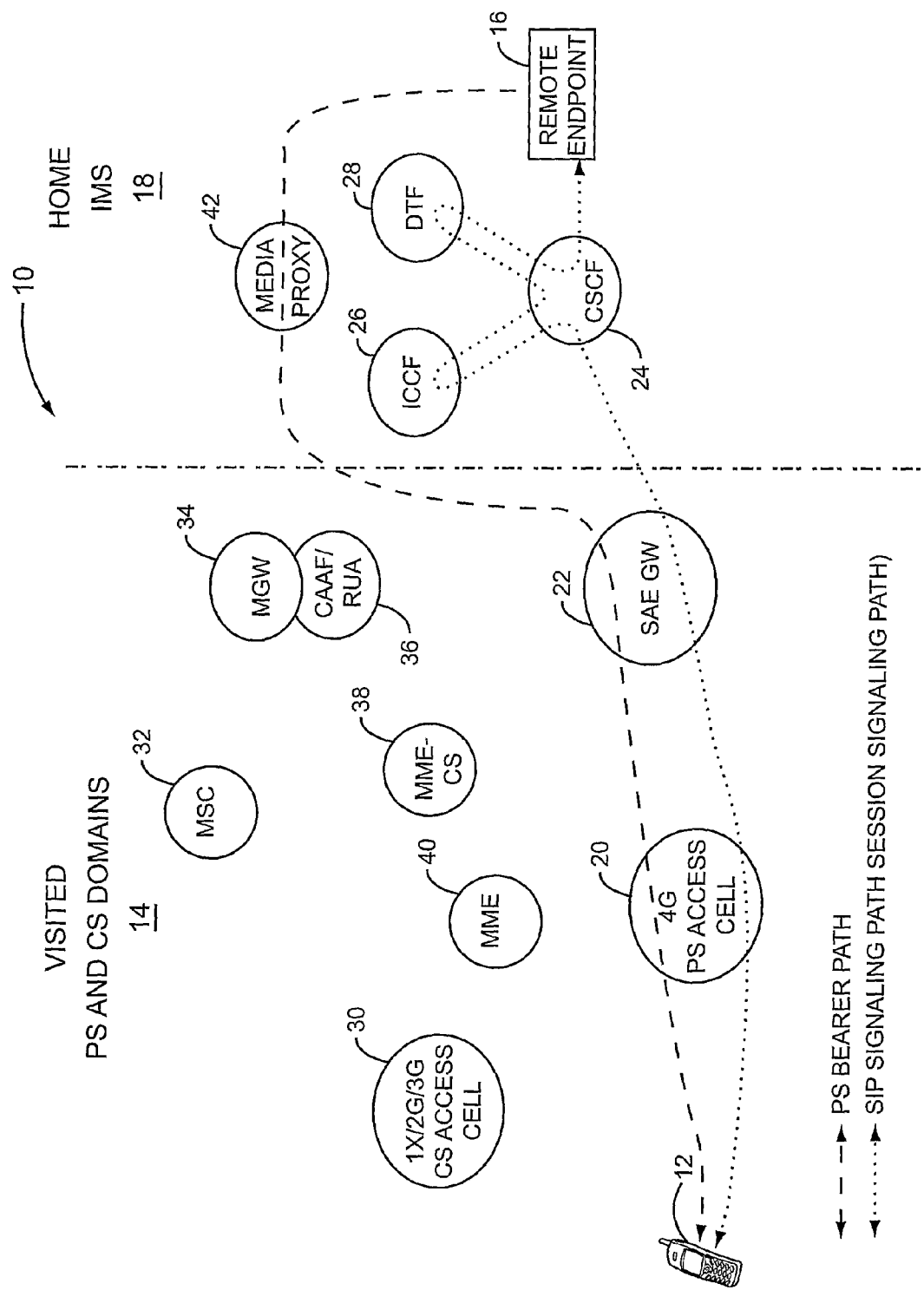

FIG. 5 illustrates a communication environment according to a second embodiment, where a user element is supported through PS access.

Figure 6:
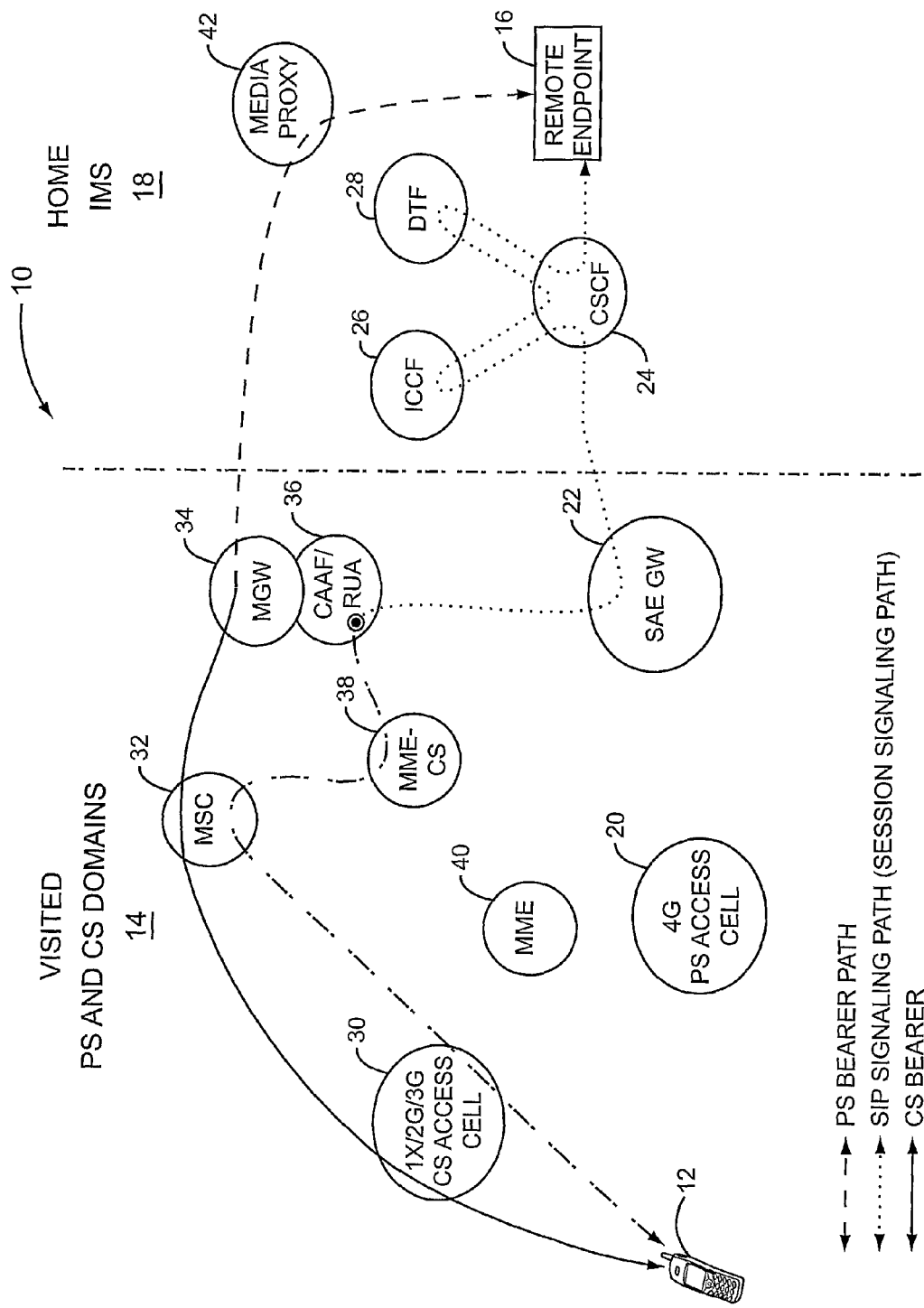
Figure 7A:
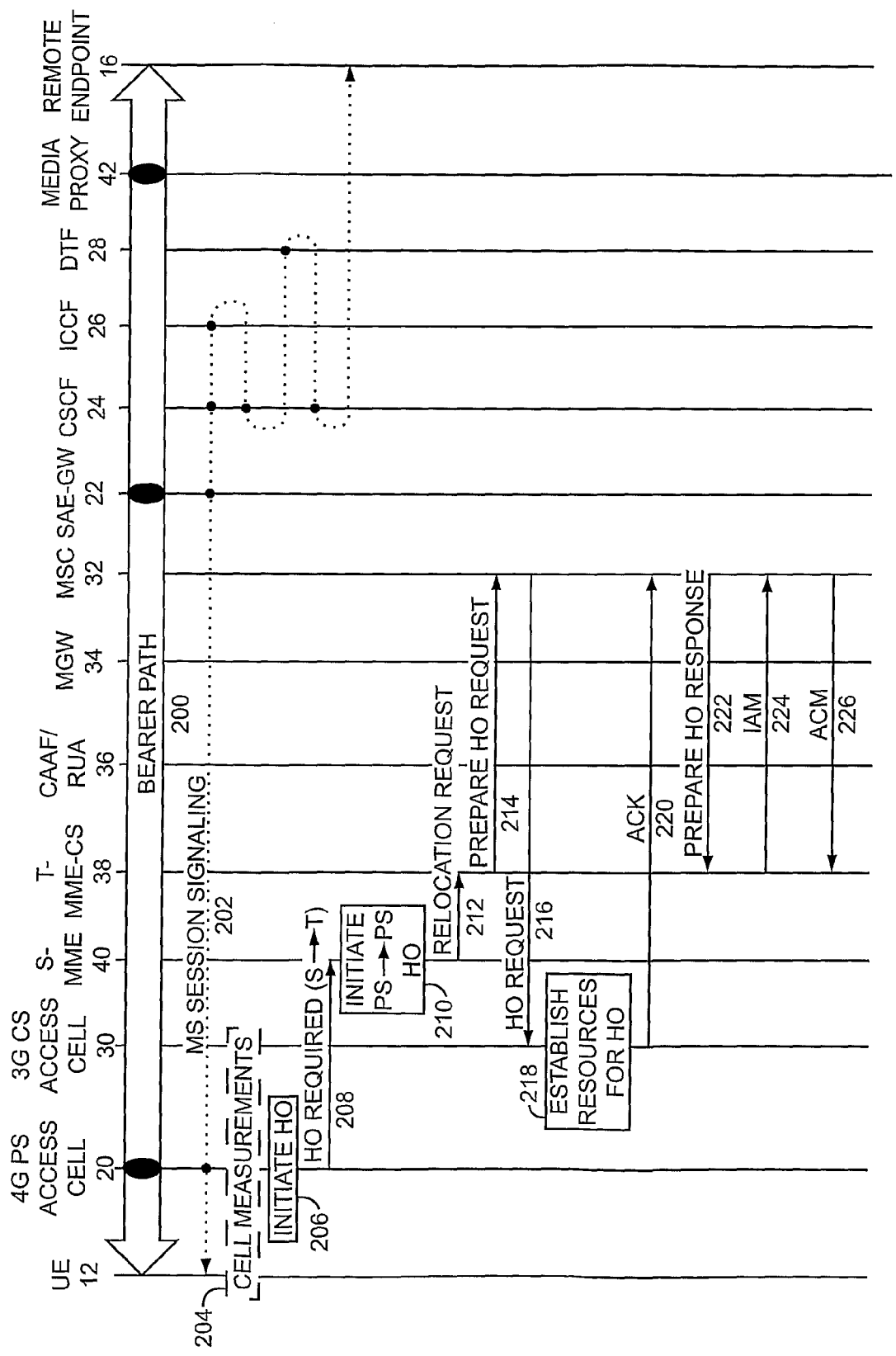
Figure 7B:
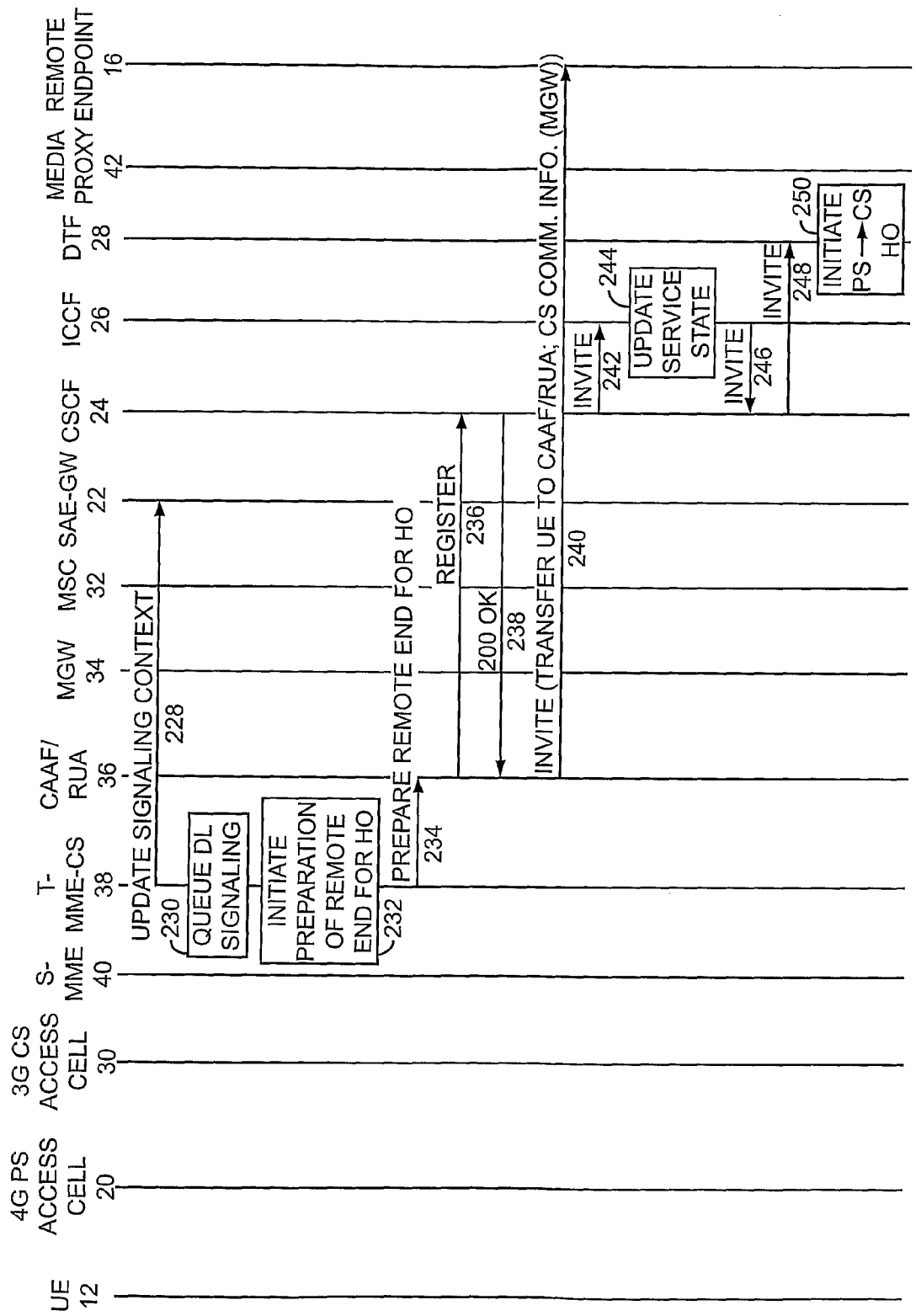
Figure 7C:
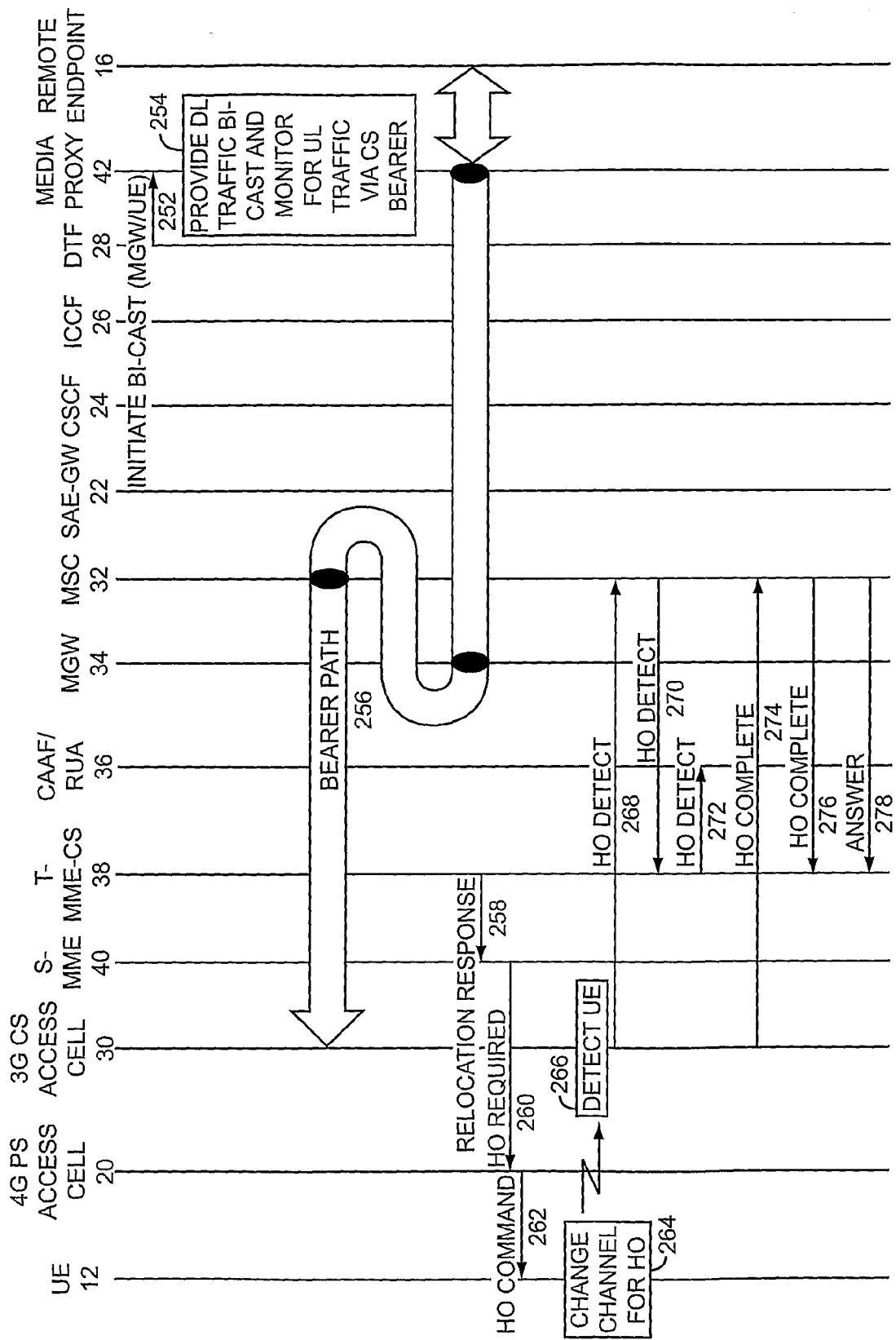
Figure 7D:
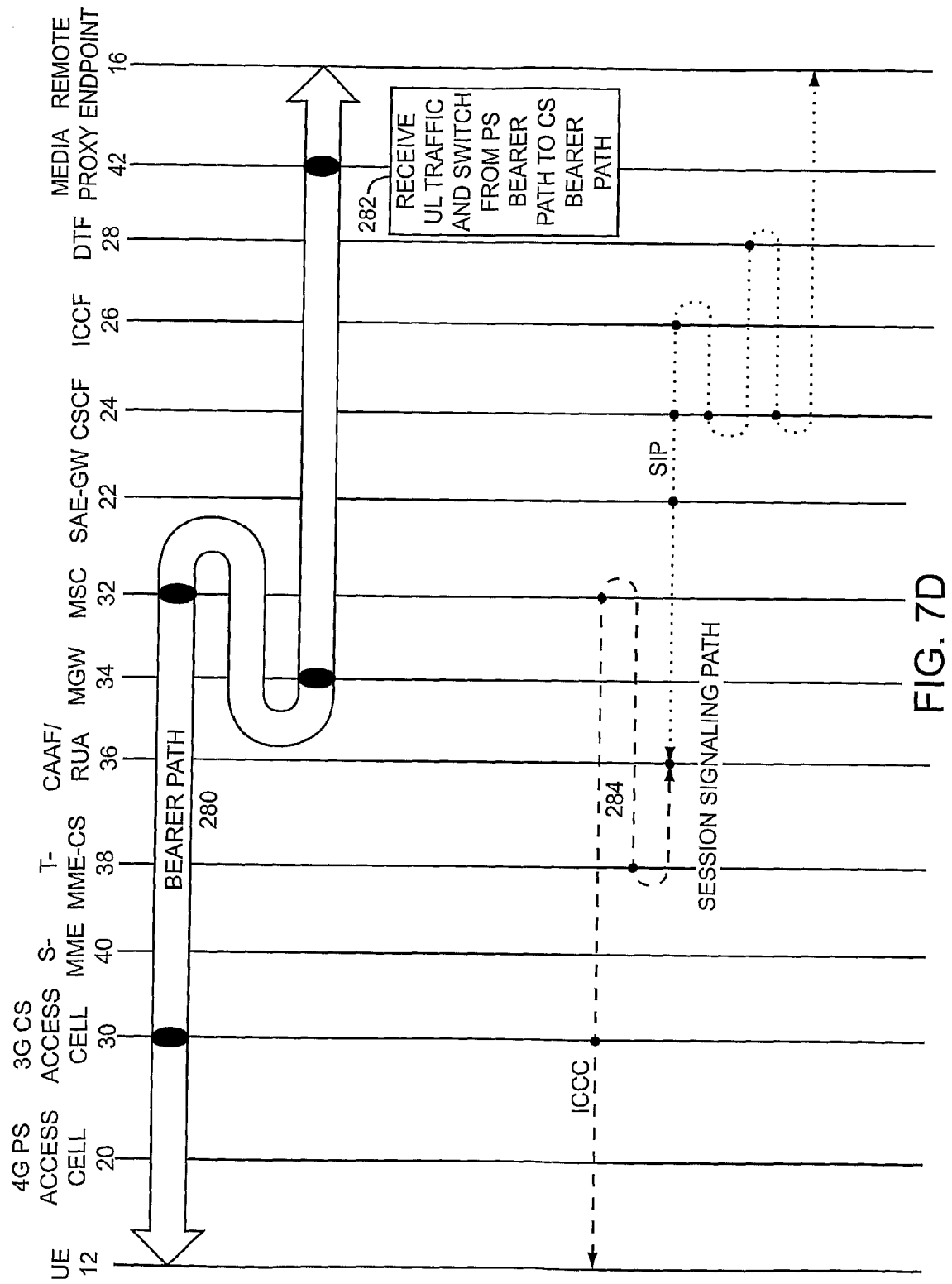

FIG. 6 illustrates a communication environment according to the second embodiment, where the user element is supported through CS access.

FIGS. 7A-7D provide a communication flow for an inter-subsystem transfer from a PS access cell to a CS access cell according to the second embodiment of the present invention.

Figure 8A:
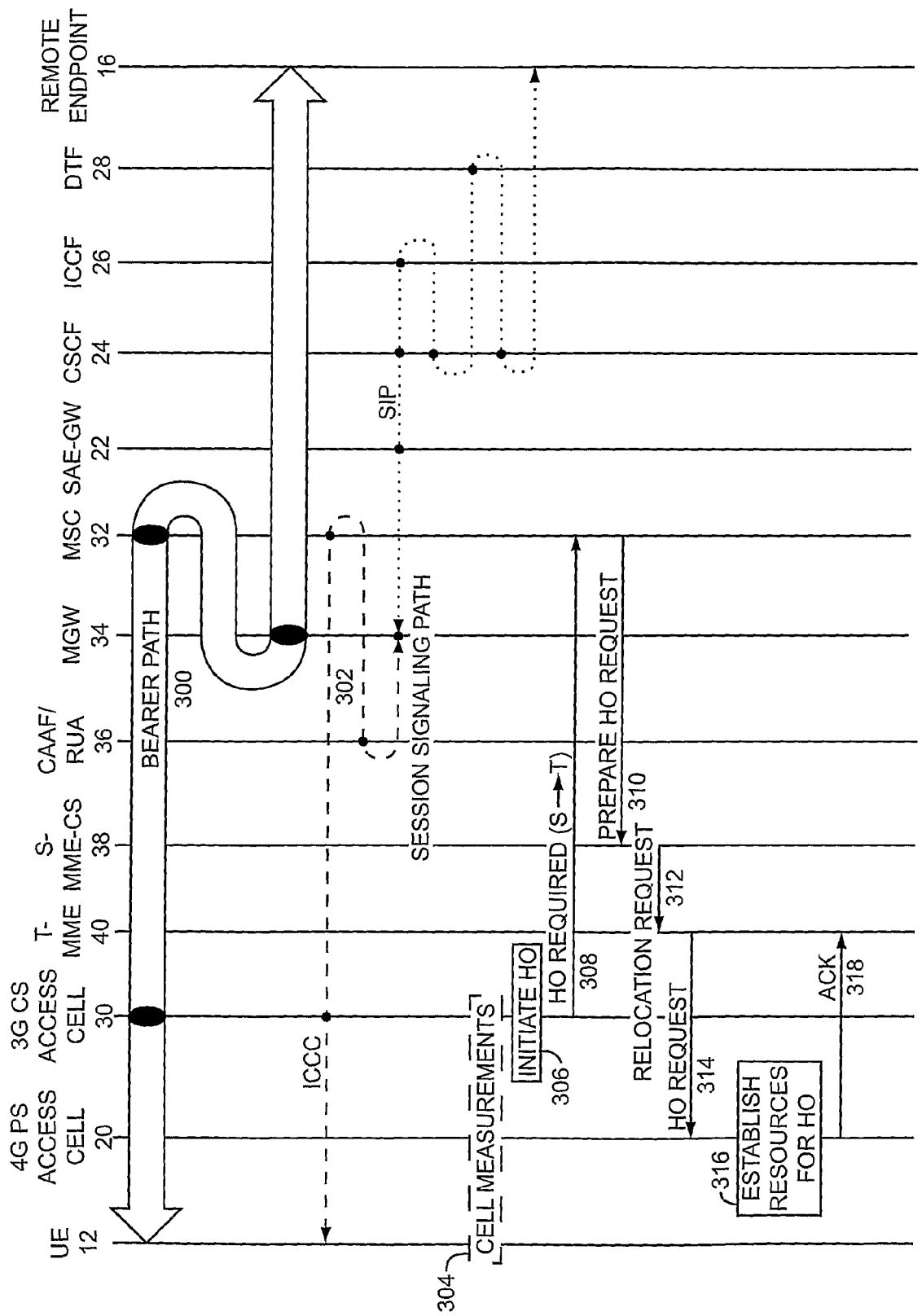
Figure 8B:
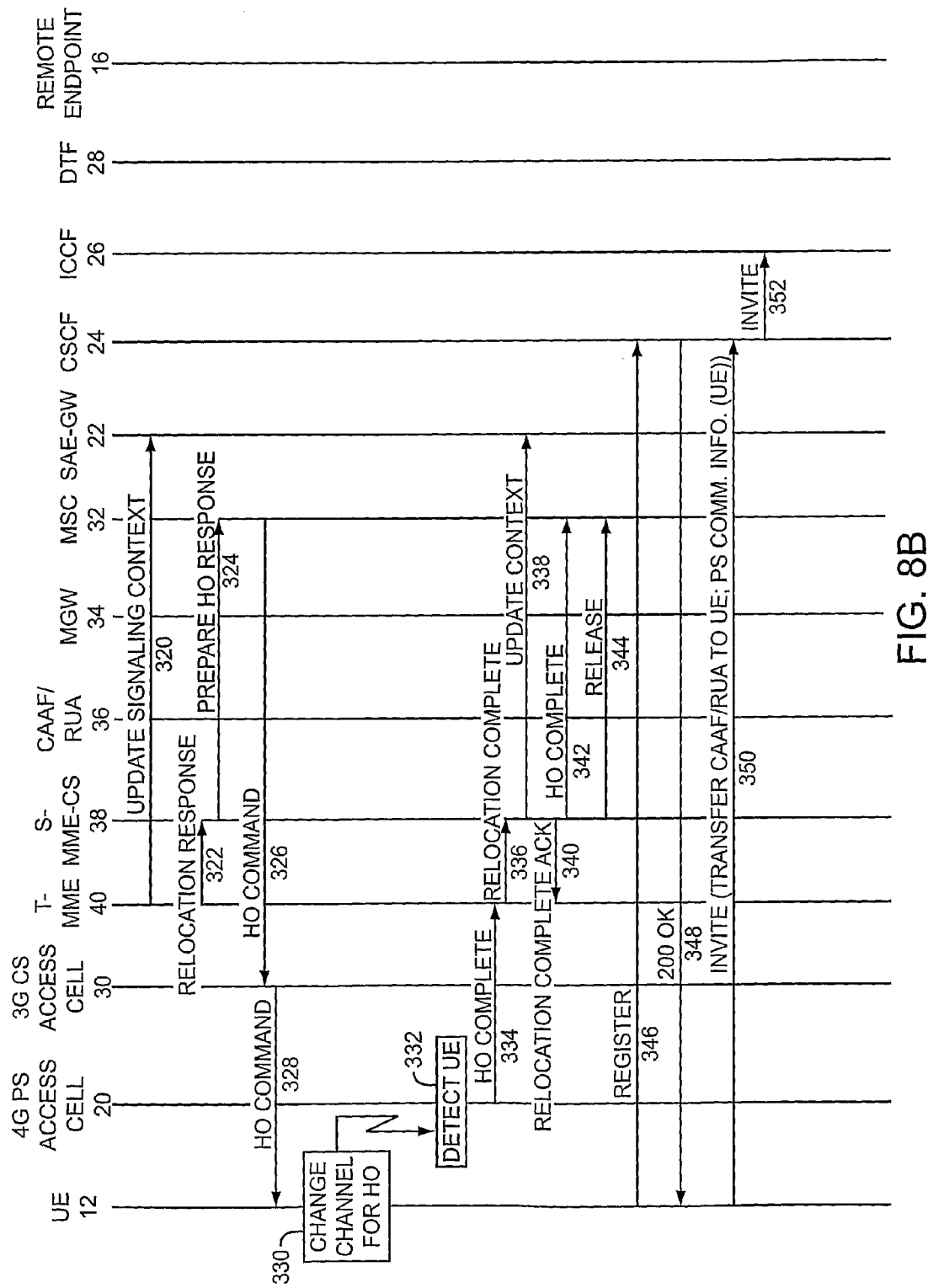
Figure 8C:
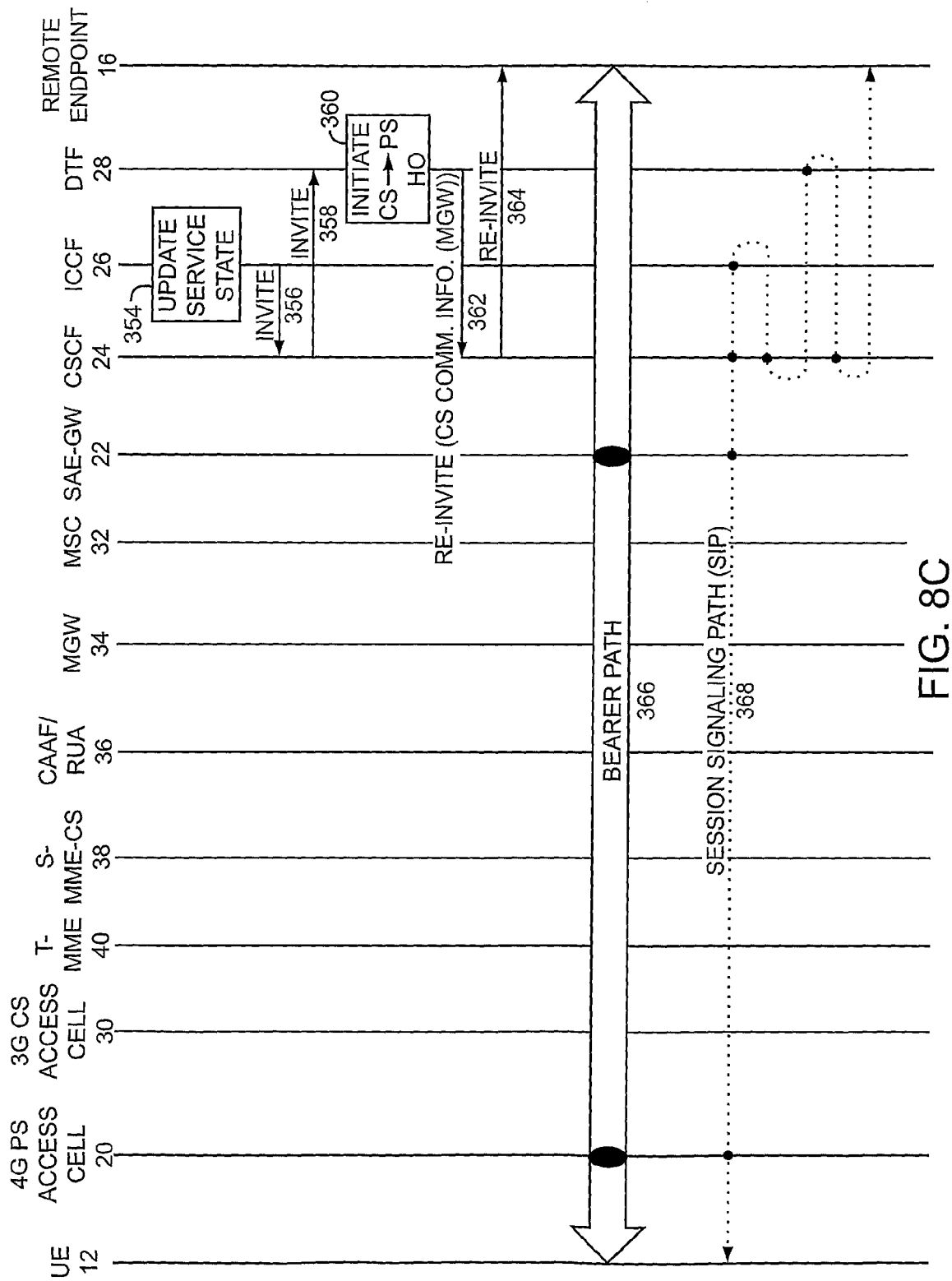

FIGS. 8A-8C are a communication flow for an inter-subsystem transfer from the CS access cell to the PS access cell according to the first embodiment of the present invention.

Figure 9:
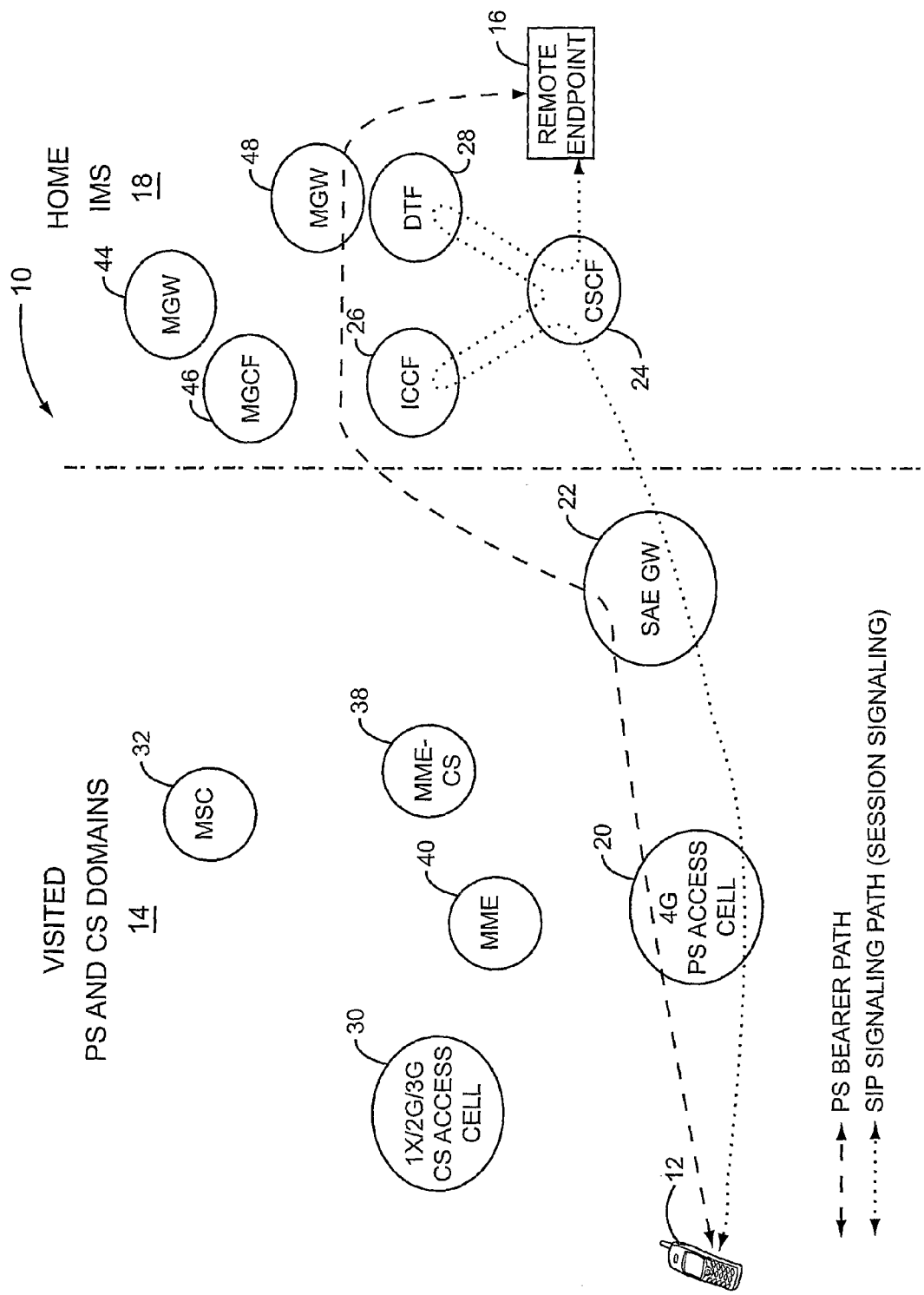

FIG. 9 illustrates a communication environment according to a third embodiment, where a user element is supported through PS access.

Figure 10:
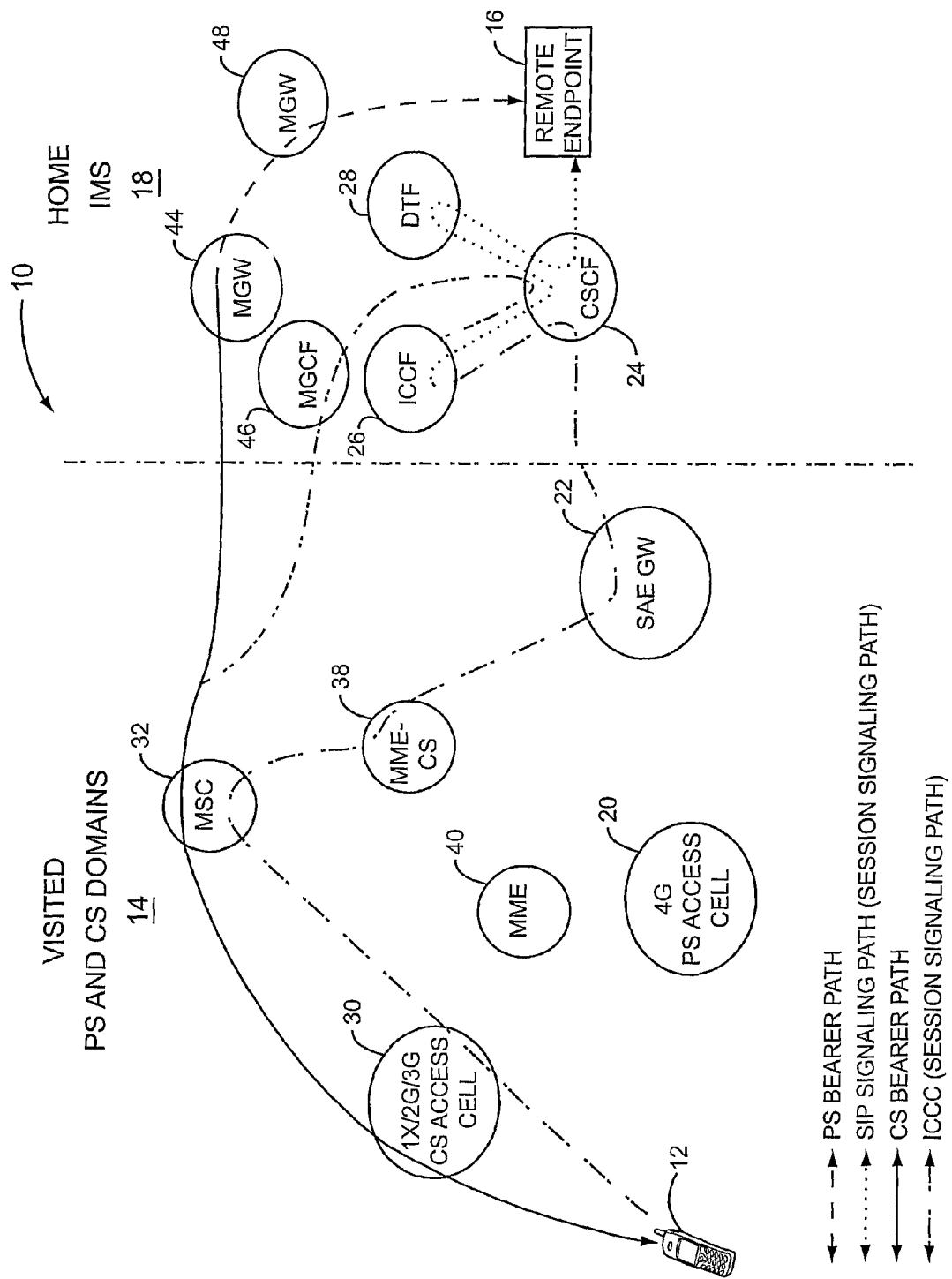
Figure 11:
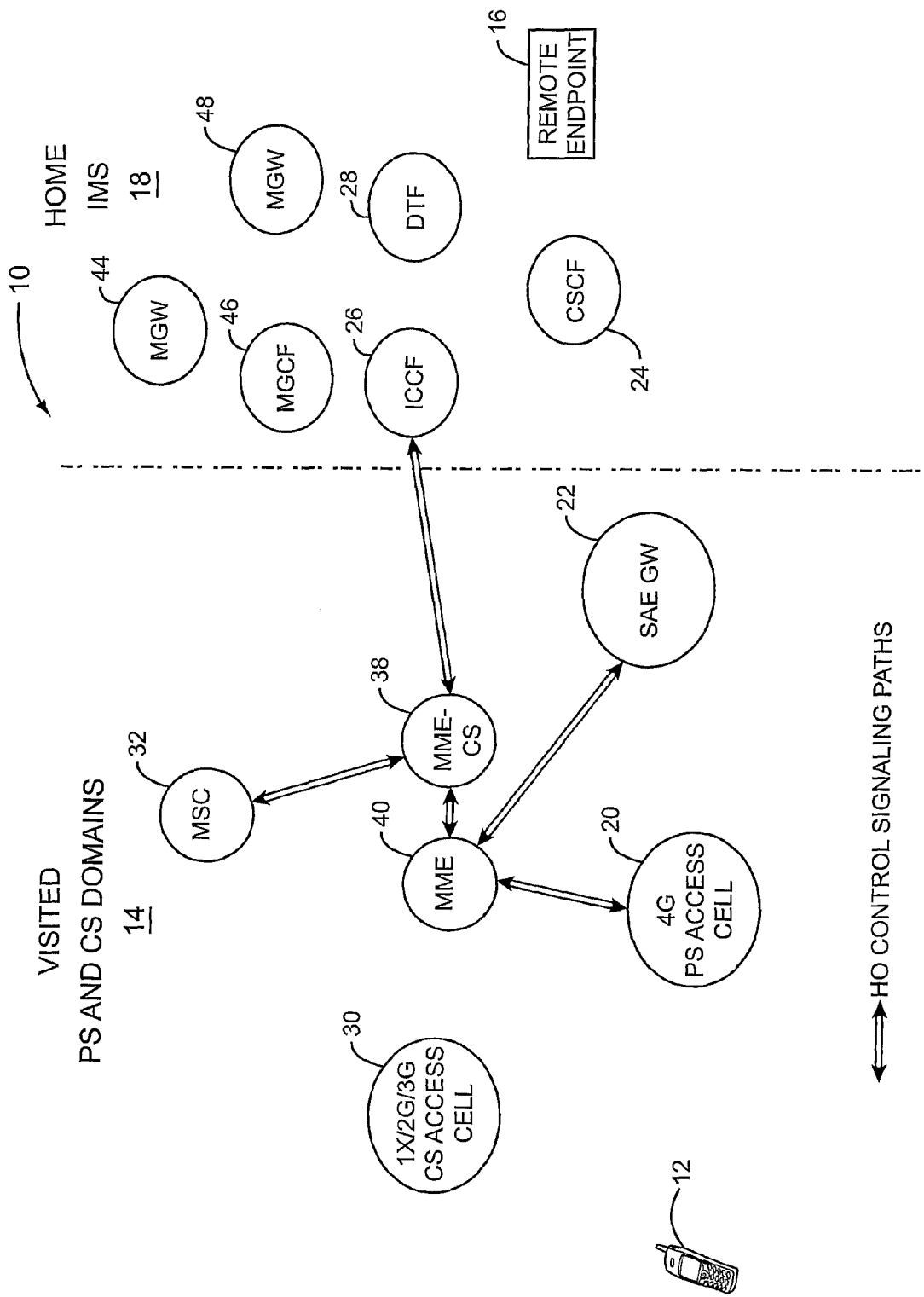
Figure 12A:
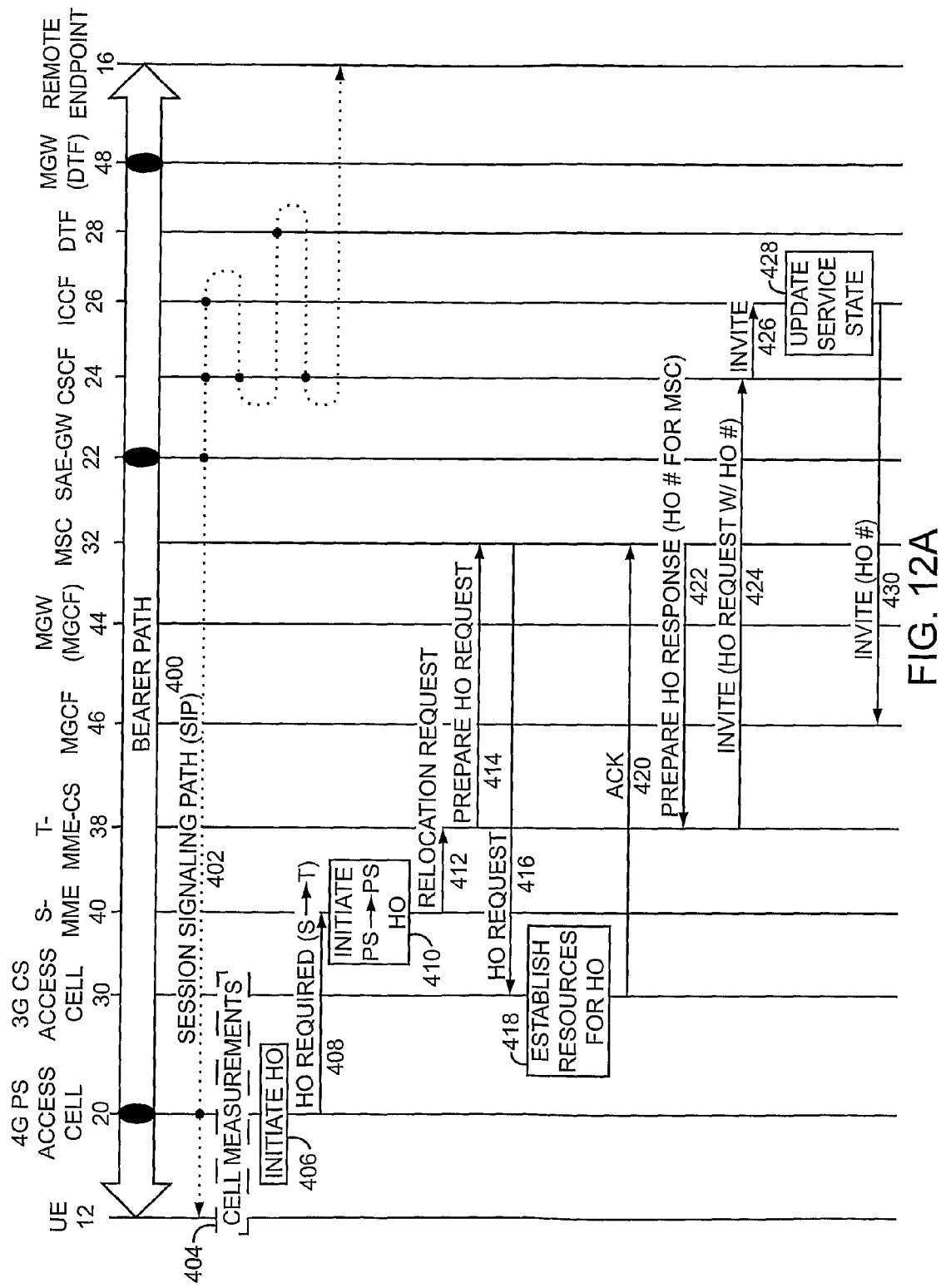
Figure 12B:
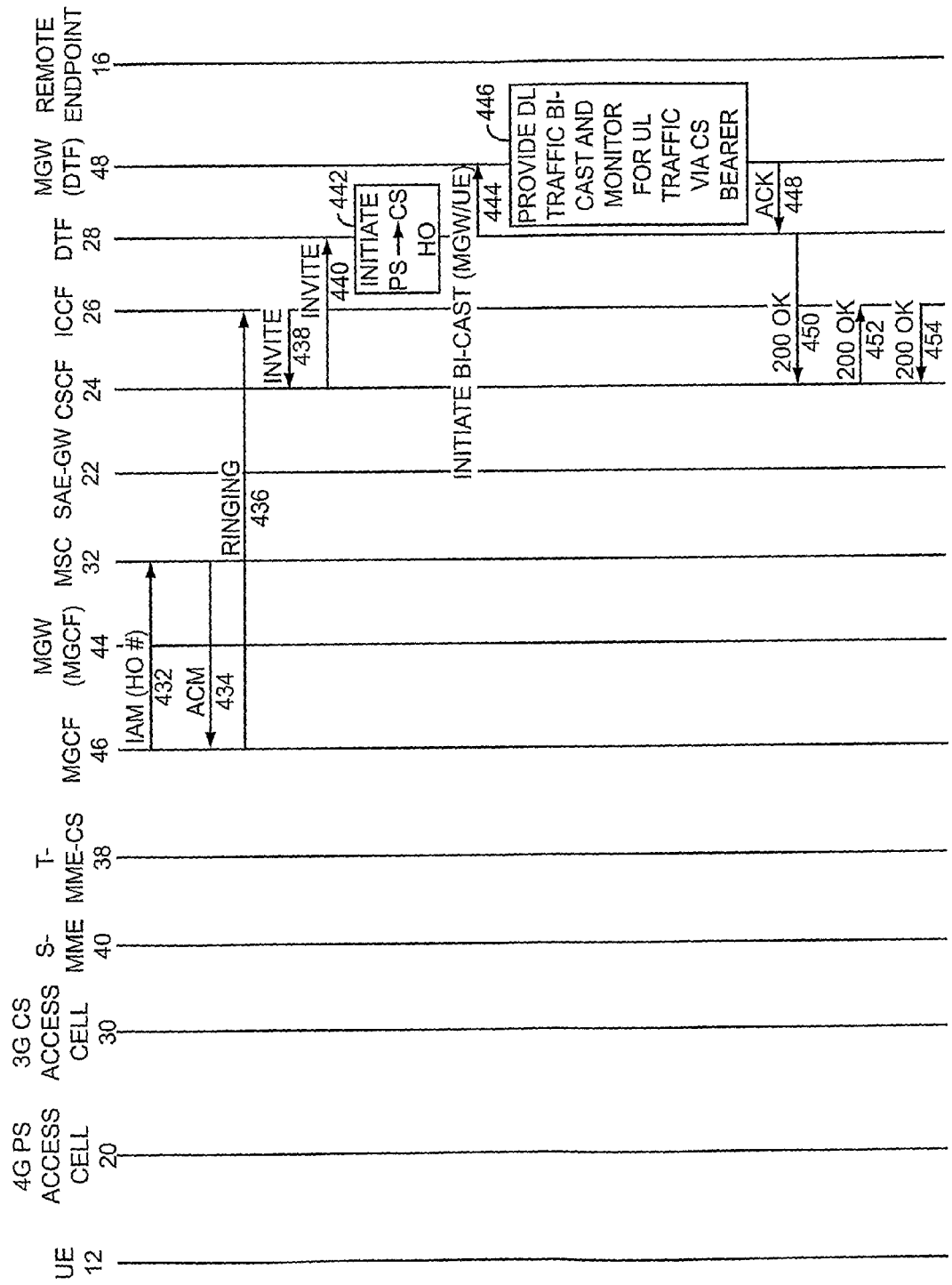
Figure 12C:
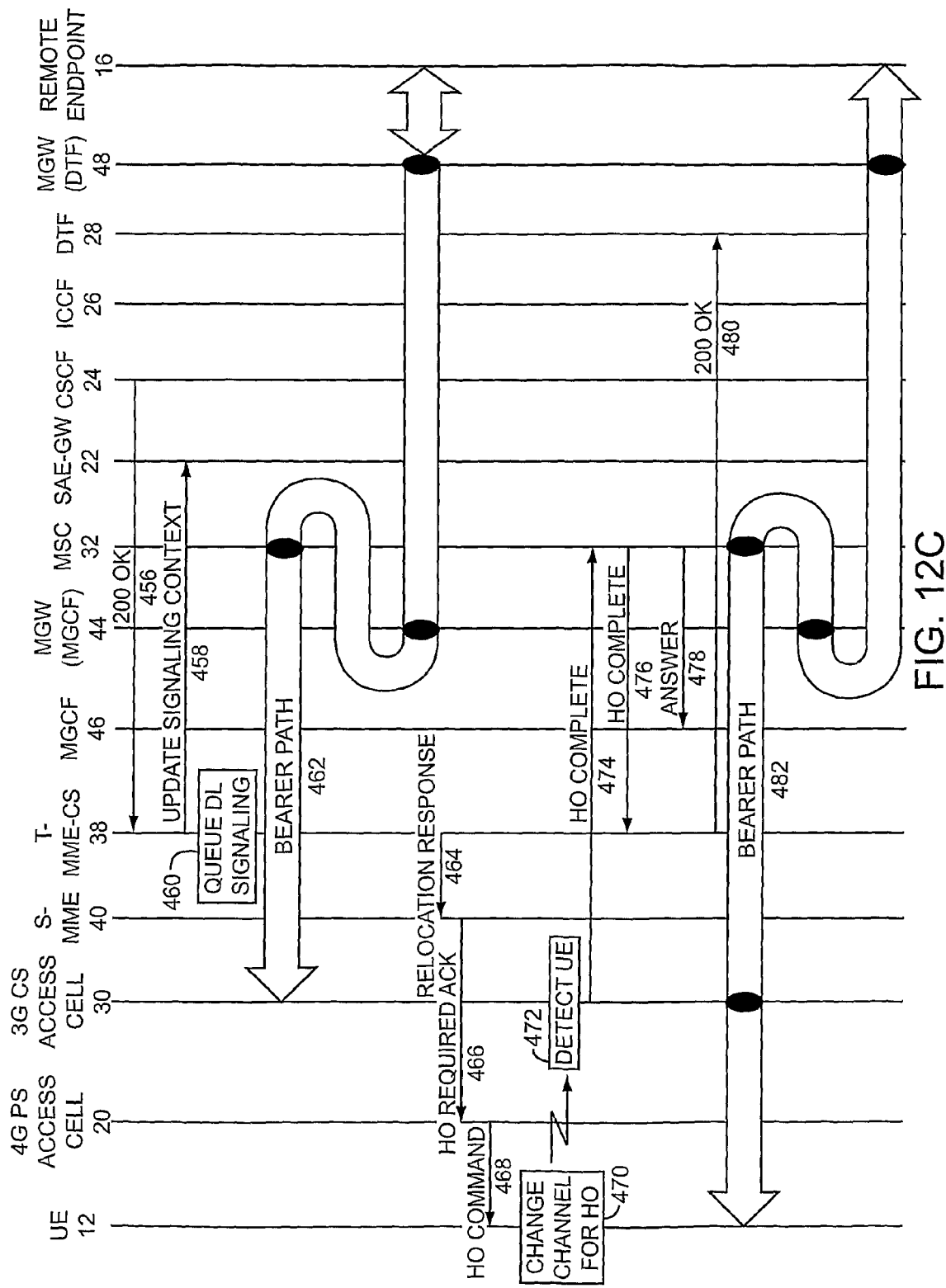
Figure 12D:
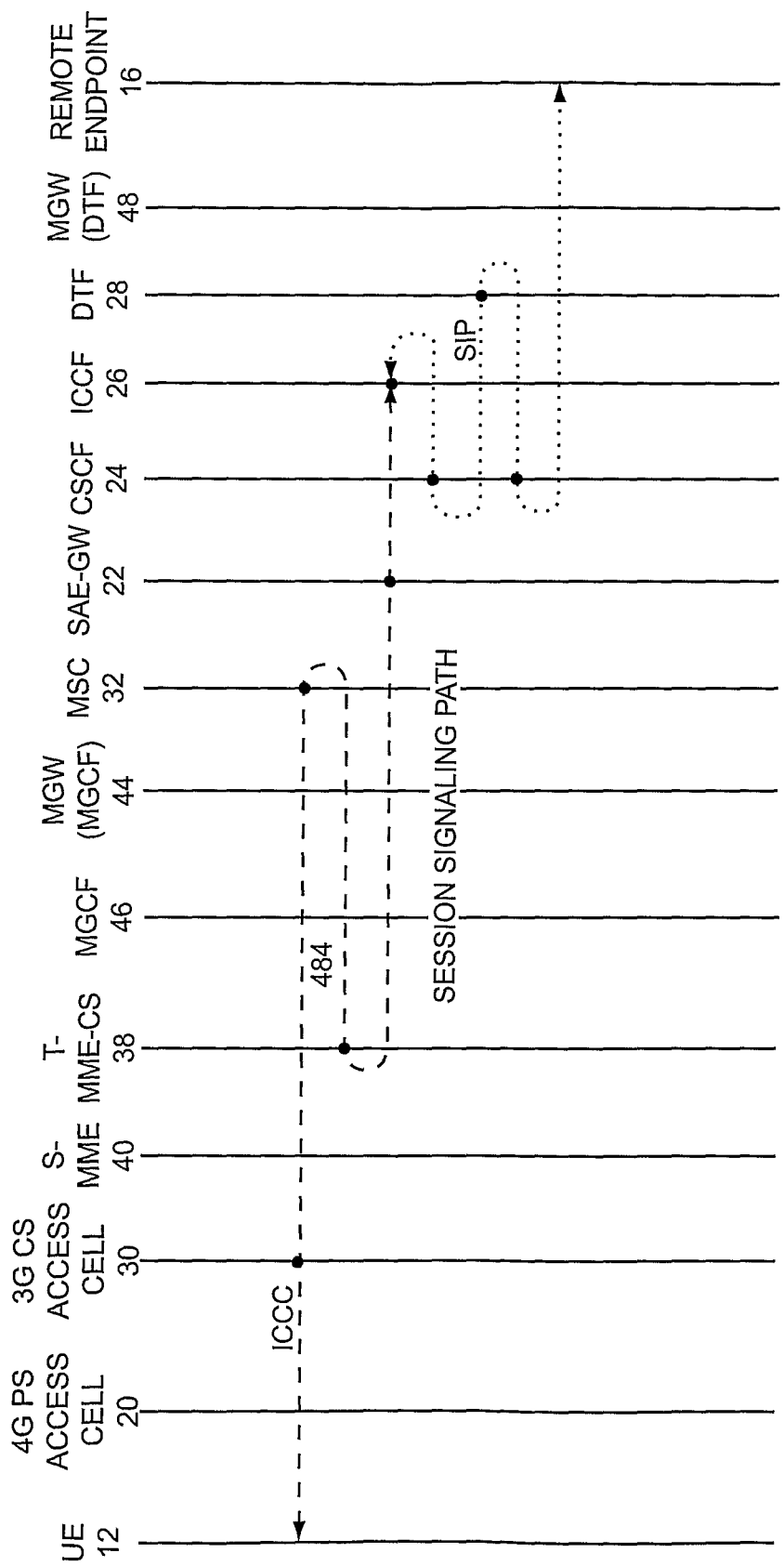

FIG. 10 illustrates a communication environment according to the third embodiment, where the user element is supported through CS access FIG. 11 illustrates handover control signaling paths for the third embodiment of the present invention.

FIGS. 12A-12D provide a communication flow for an inter-subsystem transfer from a PS access cell to a CS access cell according to the third embodiment of the present invention.

Figure 13:
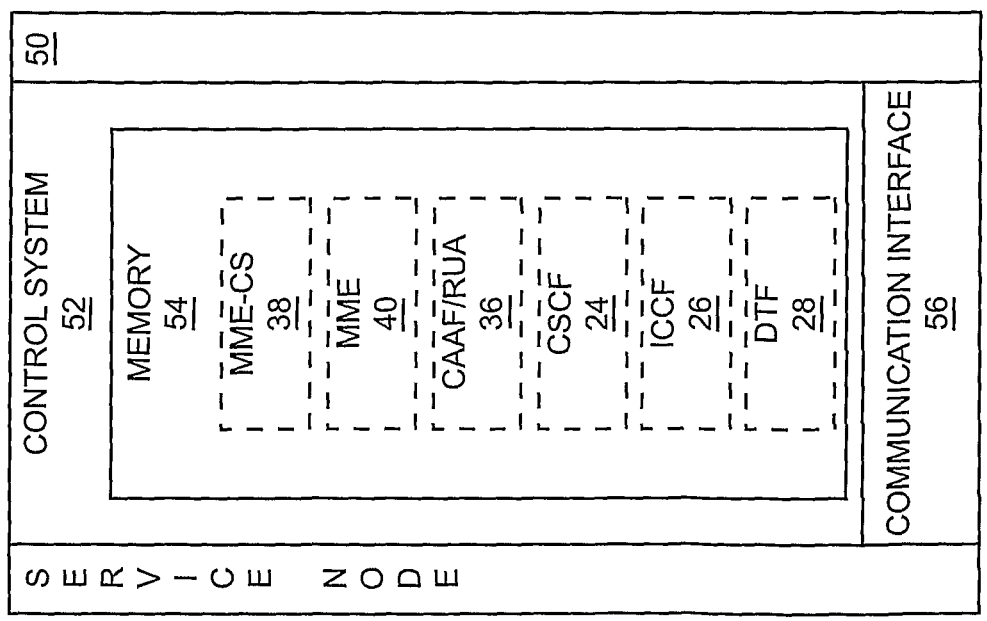

FIG. 13 is a block representation of a service node according to one embodiment of the present invention.

Figure 14:
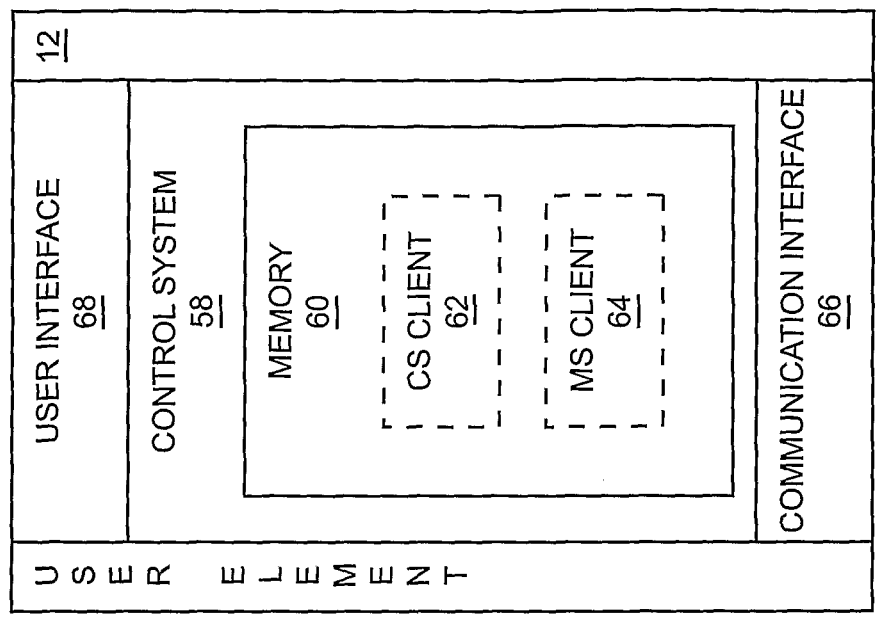

FIG. 14 is a block representation of a user element according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In general, the present invention provides for a direct inter-subsystem transfer of an active communication session, such as a call, between a packet subsystem (PS) and a circuit-switched subsystem (CS) in an efficient and effective manner while maintaining service control and continuity. Further, the inter-subsystem transfer may take place between a PS of one generation and a CS of another generation. A user element is able to support communications via the PS and CS through PS access and CS access networks, respectively. Application layer service control for a communication session is anchored in a multimedia subsystem (MS), such as an Internet Protocol MS (IMS), regardless of whether the user element is being served by the PS or CS. When the user element transitions between the PS and CS, the state of the communication session is maintained in the MS across the inter-subsystem transfer. For an inter-subsystem transfer between the PS and CS, a radio layer handover supports the transition of radio access for the user element from one subsystem to another. To maintain service control across the transfer, the MS provides an application layer transfer to maintain a session signaling path for session signaling between the user element and a remote endpoint. The state of the communication session before the transfer is maintained after the transfer by the MS. Prior to delving into the details of the invention, an overview of the different bearer and session signaling paths for a user element being served by a PS and a CS, respectively, are provided according to one embodiment of the present invention.

Figure 1:
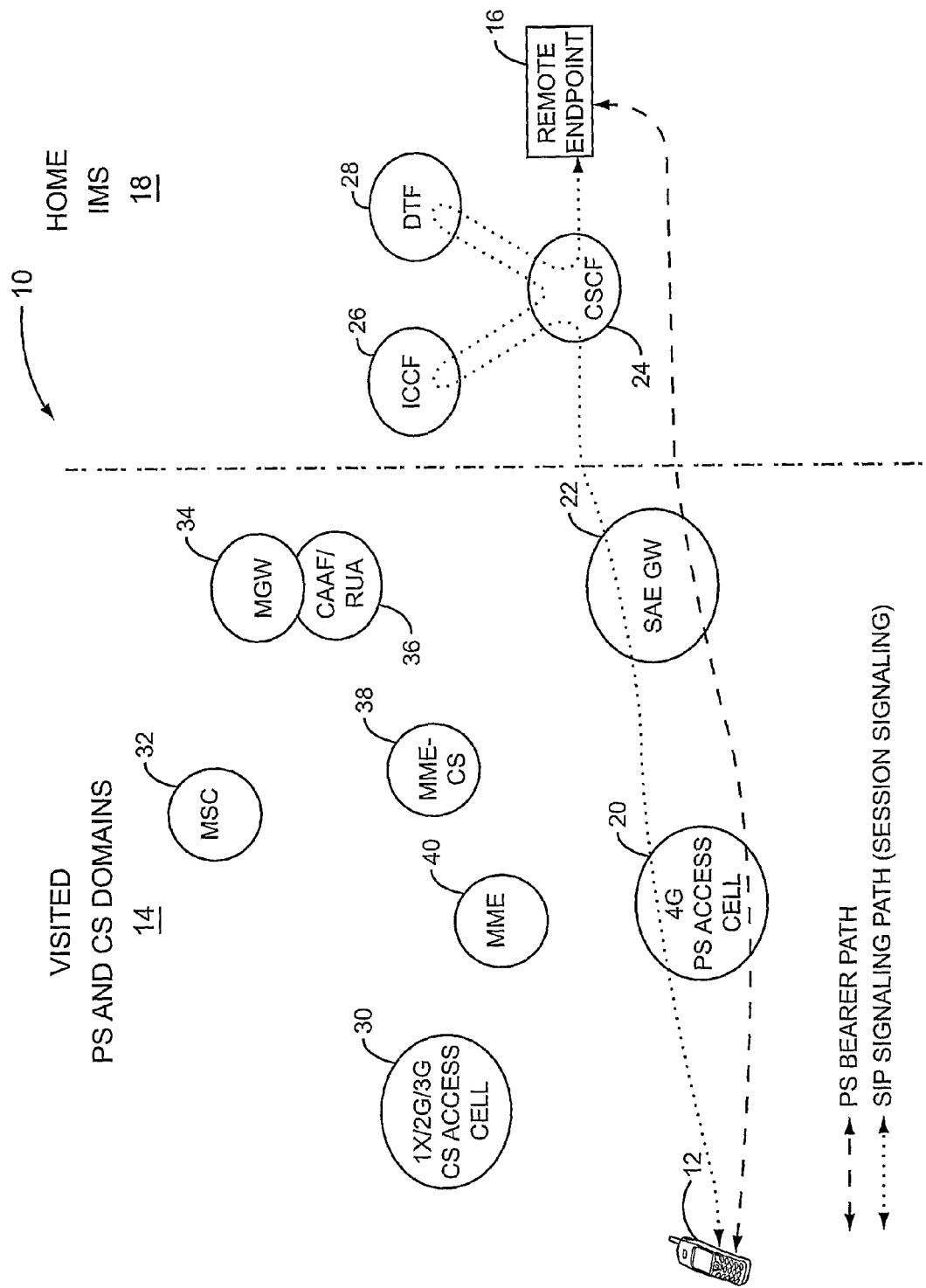
FIG. 1 illustrates a communication environment according to a first embodiment, where a user element is supported through PS access.

With particular reference to FIG. 1, an exemplary communication environment 10 is provided wherein a user element 12 is served by PS and CS domains 14. As illustrated, the user element 12 is engaged in a communication session with a remote endpoint 16, and at least part of the session control for the communication session is provided by an IMS 18. In this example, the PS and CS domains 14 are the currently serving, or visited, PS and CS domains, while the IMS 18 is the home IMS for the user element 12. As depicted, the communication session in FIG. 1 is supported in the PS, and as such, the PS bearer path between the user element 12 and the remote endpoint 16 extends through a PS access cell 20 and a System Architecture Evolution (SAE) or like gateway 22. In this example, the PS access cell 20 is a fourth generation (4G) PS access cell that provides packet-based communications with the user element 12 via a given radio access link. Session signaling is facilitated using SIP, wherein a session signaling path extends from the user element 12 through the PS access cell 20 and the SAE gateway 22 into the home IMS 18. From the SAE gateway 22, the signaling path extends to a call/session control function (CSCF) 24, to an IMS CS control function (ICCF) 26, back to the CSCF 24, to a domain transfer function (DTF) 28, back to the CSCF 24, and on toward the remote endpoint 16.

Figure 2:
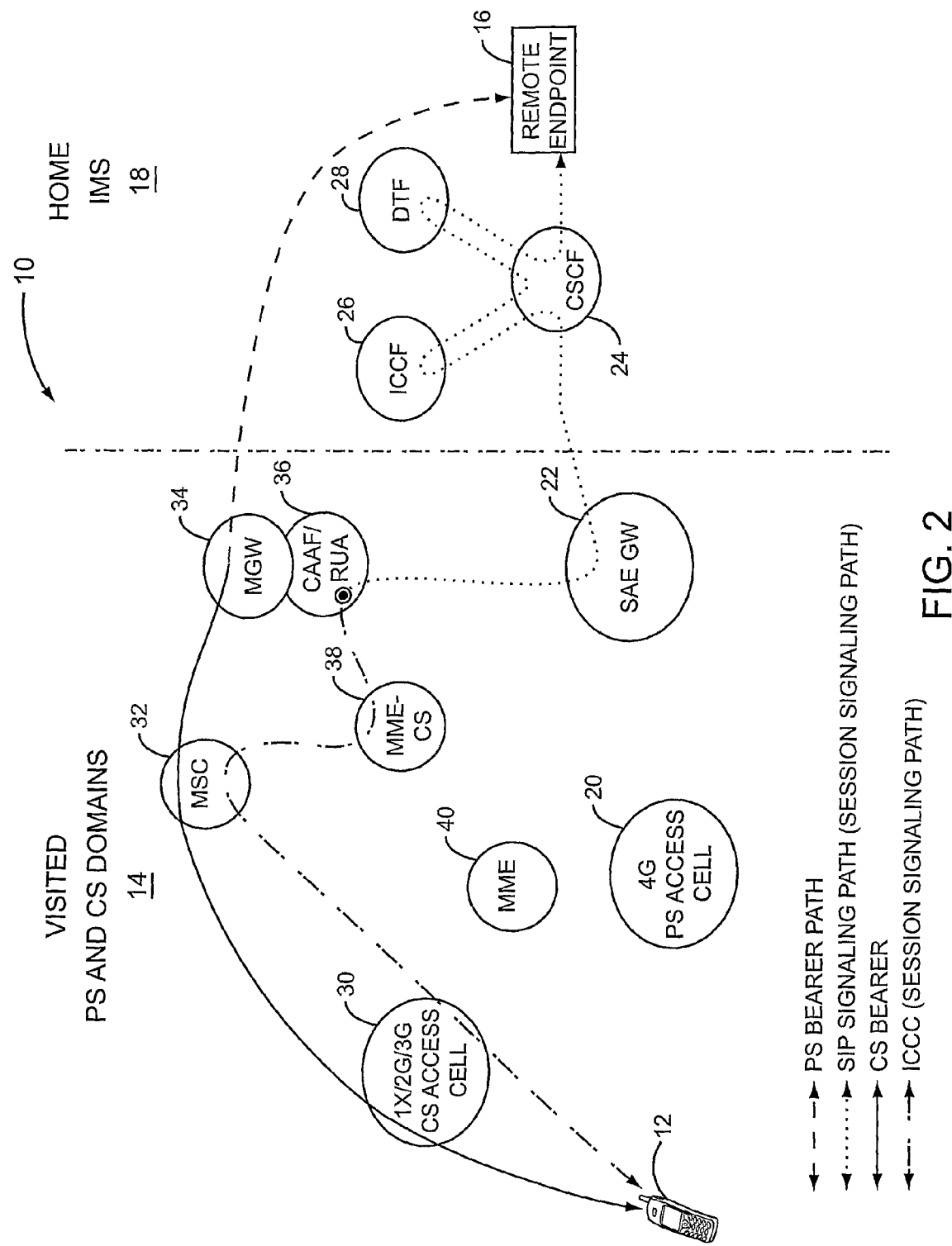
FIG. 2 illustrates a communication environment according to the first embodiment, where the user element is supported through CS access.

With reference to FIG. 2, the communication session between the user element 12 and the remote endpoint 16 is supported by the CS. As such, the bearer path between the user element 12 and the remote endpoint 16 extends through a CS access cell 30, a mobile switching center (MSC) 32 that supports the CS access cell 30, and a media gateway (MGW) 34. The CS access cell 30 is illustrated as being any one of a first, second, or third generation (1x, 2G, 3G) CS access cell that is provided in a first, second, or third generation access network. A CS bearer path extends between the user element 12 and the media gateway 34, while a PS bearer path extends between the media gateway 34 and the remote endpoint 16. The session signaling path has multiple segments. A first segment extends between the user element 12 and a CS Access Adaptation Function (CAAF)/remote user agent (RUA), which is referred to as a CMF/RUA 36, through the CS access cell 30, the MSC 32, and a Mobility Management entity-Circuit Switched (MME-CS) 38. This segment is referred to as an IMS CS control channel (ICCC), which may ride on an underlying CS signaling channel that extends along the same path. The second segment of the session signaling path extends between the CMF/RUA 36 to the SAE gateway 22, while a third segment extends from the SAE gateway 22 toward the remote endpoint 16 through the CSCF 24, ICCF 26, and DTF 28. Notably, the third segment of the session signaling path between the SAE gateway 22 and the remote endpoint 16 is the same as that illustrated in FIG. 1, wherein the communication session was supported in the PS.

For an inter-subsystem transfer from the PS to the CS, the bearer and session signaling paths illustrated in FIG. 1 will transition to the bearer and session signaling paths of FIG. 2. Similarly, for an inter-subsystem transfer from the CS to the PS, the bearer and session signaling paths of FIG. 2 will transition to the bearer and session signaling paths of FIG. 1. For an inter-subsystem transfer in either direction, a radio layer handover between the PS and CS access cells 20, 30 is initially provided.

Figure 3:
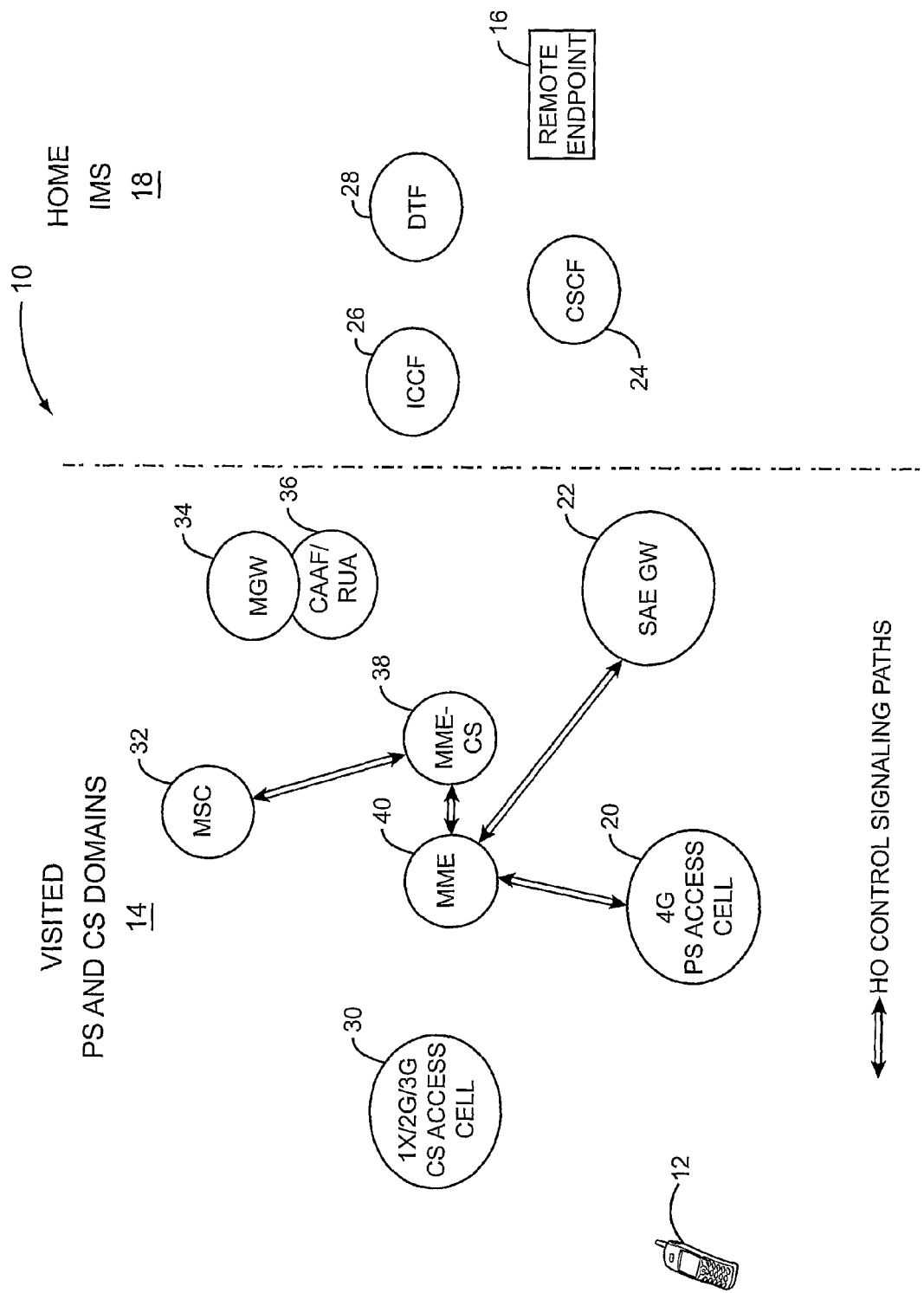
FIG. 3 illustrates handover control signaling paths for the first embodiment of the present invention.

In one embodiment, the present invention employs the MME-CS 38 to facilitate a radio layer handover between the PS and CS access cells 20, 30 of the respective subsystems. The MME-CS 38 is provided between a standard MME 40 associated with the PS access cell 20 of the PS and the MSC 32, which supports the CS access cell 30 of the CS. For a radio layer handover from the PS to the CS (FIG. 1 to FIG. 2), the MME-CS 38 acts as a target MME, wherein a radio layer handover is provided from the standard MME 40 toward the MME-CS 38. The MME-CS 38 acts as a source MSC to relay the radio layer handover toward the MSC 32 for the given CS access cell 30. As a result, the radio access is transitioned from the PS access cell 20 of the PS to the CS access cell 30 of the CS. For a radio layer handover from the CS to the PS (FIG. 2 to FIG. 1), the MME-CS 38 acts as a target MSC, wherein a radio layer handover is provided from the MSC 32 toward the MME-CS 38. The MME-CS 38 acts as a source MME to relay the radio layer handover toward the standard MME 40 for the given PS access cell 20. The handover (HO) control signaling paths are illustrated in FIG. 3. Notably, the MME 40 may need to work with the SAE gateway 22 in conjunction with the PS access cell 20 to facilitate inter-subsystem transfers into and out of the PS.

The MME-CS 38 is also associated with the CAAF/RUA 36. When the user element 12 is in the CS, the CAAF/RUA 36 acts a user agent toward the IMS 18 for service control on behalf of the user element 12. As such, the CAAF/RUA 36 acts a liaison between the user element 12 and the IMS 18 when the user element 12 is served by the CS. The CAAF/RUA 36 and the user element 12 communicate over the ICCC, which extends through the MME-CS 38, MSC 32, and the CS access cell 30. The CMF/RUA 36 may communicate with the IMS 18 using a session control protocol, such as the Session Initiation Protocol (SIP), directly or via the SAE gateway 22. The CAAF/RUA 36 provides interworking between signaling over the ICCC and a SIP signaling path that extends into the IMS 18.

Session signaling for a communication session may be anchored in the IMS 18 at the DTF 28 and the ICCF 26. The DTF 28 and ICCF 26 may be provided by the same or different entities. The DTF 28 facilitates the application layer transfers such that service control moves from one subsystem to another while the ICCF 26 maintains the service state for a communication session across inter-subsystem transfers. The ICCF 26 may also act as another RUA on behalf of the user element 12, and may cooperate with the CAAF/RUA 36 to maintain service control and service state, when the user element 12 is served by the CS. As noted above, session signaling from the PS and CS is routed through the CSCF 24, which functions to place the ICCF 26 and the DTF 28 in the session signaling path.

An exemplary PS-to-CS inter-subsystem transfer is illustrated with the communication flow provided in FIGS. 4A through 4C, according to one embodiment of the present invention. Initially, assume that a PS bearer path is established between the user element 12 and the remote endpoint 16 through the PS access cell 20 and the SAE gateway 22 (step 100). Further assume that a session signaling path is established between the user element 12 and the remote endpoint 16, and extends through the PS access cell 20, SAE gateway 22, CSCF 24, ICCF 26, and DTF 28, wherein the CSCF 24 invokes both the ICCF 26 and the DTF 28 (step 102). At this point, the session signaling path is a SIP signaling path from the user element 12 to the remote endpoint 16. As such, a communication session is provided between the user element 12 and the remote endpoint 16, wherein the user element 12 is served by the PS access cell 20 in the PS.

At some point, the user element 12 will determine that there is a need to transfer from the currently serving PS access cell 20 to the CS access cell 30. In this example, the PS access cell 20 is a fourth generation (4G) PS access cell, wherein the CS access cell 30 is a third generation (3G) CS access cell. While the PS access cell 20 is serving the user element 12, signal strength measurements associated with the serving cell are compared to those associated with adjacent cells in the same or different subsystem (step 104). The adjacent cells are potential target cells, and in this example, will include the CS access cell 30. When conditions dictate a handover from the PS access cell 20 to the CS access cell 30, the PS access cell 20 will initiate a handover (step 106) and send a Handover Required message toward the MME 40, which is designated as a source MME (S-MME) (step 108). The target for the Handover Required message corresponds to the MME-CS 38, which is designated as a target MME-CS (T-MME-CS). From the perspective of the S-MME 40, the T-MME-CS 38 appears as a target MME within the PS, and as such, the S-MME 40 will initiate what it believes is a PS-to-PS handover (step 110) by sending a Relocation Request toward the T-MME-CS 38 (step 112). The T-MME-CS 38 will send a Prepare Handover Request to the MSC 32 that supports the CS access cell 30 (step 114). The MSC 32 will act to establish radio resources in the CS access cell 30 by sending a Handover Request to the CS access cell 30 (step 116), which will establish resources for the handover (step 118) and provide an Acknowledgment (ACK) back to the MSC 32 (step 120).

Upon receipt of the acknowledgement, the MSC 32 will send a Prepare Handover Response to the T-MME-CS 38 to indicate that the radio resources have been established in the CS access cell 30 (step 122). The T-MME-CS 38 will send an Integrated Services User Part (ISUP) Initial Address Message (IAM) to the MSC 32 (step 124) to set up a circuit-switched bearer path between the media gateway 34, which is associated with the T-MME-CS 38, and the MSC 32. The MSC 32 will respond to the IAM with an ISUP Address Complete Message (ACM) (step 126) to indicate that the CS bearer path is being established. The T-MME-CS 38 will then update the signaling context for the session at the SAE gateway 22 to indicate that the session signaling is being transferred from the user element 12 to the CAAF/RUA 36 (step 128). At this point, the portion of the ICCC between the user element 12 and the T-MME-CS 38 is not available. As such, the T-MME-CS 38 will queue the downlink session signaling (step 130) until the ICCC can be established to the user element 12. The T-MME-CS 38 will then initiate preparation of the remote end for the handover (step 132) by sending a message to the CAAF/RUA 36 to prepare the remote end for the handover (step 134). At this point, the CAAF/RUA 36 may register with the CSCF 24 on behalf of the user element 12 by sending a Register message to the CSCF 24 (step 136). The CSCF 24 will respond by providing a 200 OK message (step 138).

At this point, the T-MME-CS 38 will send a Relocation Response to the S-MME 40 to instruct the user element 12 to effect the radio layer handover (step 140). As such, the S-MME 40 will send a Handover Required message to the PS access cell 20 (step 142), which will send a Handover Command to the user element 12 (step 144). The user element 12 will then retune itself to effectively change from a channel within the PS access cell 20 to a channel in the CS access cell 30 (step 146). During this process, the CS access cell 30 will detect the presence of the user element 12 (step 148) and send a Handover Detect message toward the MSC 32 to indicate that the user element 12 has switched to the CS access cell 30 (step 150). The MSC 32 will send the Handover Detect message to the T-MME-CS 38 (step 152), which will send the Handover Detect message to the CMF/RUA 36 to indicate that the user element 12 is now being served by the CS access cell 30 (step 154).

Acting on behalf of the user element 12 and upon recognizing that the user element 12 has switched to the CS access cell 30, the CAAF/RUA 36 will initiate a domain transfer procedure to transfer session signaling from the user element 12 to the CAAF/RUA 36 by sending an Invite message to the CSCF 24 (step 156). Notably, the CMF/RUA 36 in this embodiment will not have access to the state information for the communication session prior to the inter-subsystem transfer. As such, the Invite will not provide any pre-existing state information for the communication session. However, the Invite may include CS communication information associated with the media gateway 34 to facilitate a transfer of the bearer path that was running through the SAE gateway 22 to the media gateway 34.

The CSCF 24 will forward the Invite to the ICCF 26 (step 158), which has access to the state information for the communication information because the session signaling is anchored at the ICCF 26. As such, the ICCF 26 can update the Invite with any necessary service state information (step 160) and forward the Invite back to the CSCF 24 for further processing (step 162). The CSCF 24 will then forward the Invite to the DTF 28, which also provides an anchor for the session signaling (step 164). The DTF 28 will initiate a PS-to-CS bearer and session signaling transfer toward the remote endpoint 16 (step 166). Accordingly, the DTF 28 will generate a Re-Invite to provide the remote endpoint 16 or entities operating on behalf of the remote endpoint 16 with the necessary information to support a new bearer path that runs through the media gateway 34 instead of through the SAE gateway 22. Accordingly, the CSCF 24 will receive the Re-Invite (step 168) and forward the Re-Invite toward the remote endpoint 16 (step 170). To facilitate communications with the media gateway 34, the Re-Invite will include the necessary CS communication information, which may include the address, port and Session Data Protocol (SDP) information for the media gateway 34. With this information, the remote endpoint 16 can send bearer traffic to the media gateway 34. Although not illustrated, the remote endpoint 16 will respond to the Re-Invite with a 200 OK message or the like, which will include the PS communication information necessary to allow the media gateway 34 to send bearer traffic toward the remote endpoint 16. The 200 OK message is propagated along the session signaling path to the CAAF/RUA 36, and if necessary, passed on toward the user element 12. For the domain transfer initiation, the 200 OK message will stop at the CAAF/RUA 36.

In the meantime, the CS access cell 30 may generate a Handover Complete message, which is sent to the MSC 32 to indicate that the handover is fully transitioned to the CS access cell 30 from the perspective of the user element 12 (step 172). The MSC 32 will send the Handover Complete message to the T-MME-CS 38 (step 174), and will subsequently send an ISUP Answer message to instruct the T-MME-CS 38 to complete the bearer path between the media gateway 34 and the remote endpoint 16, as well as to the user element 12 via the MSC 32 (step 176). As such, the bearer path of the user element 12 as served by the CS extends between the user element 12 and the remote endpoint 16 through the CS access cell 30, MSC 32, and media gateway 34 (step 178). The session signaling (step 180) comprises two primary segments. The first segment is the ICCC, which extends between the CAAF/RUA 36 and the user element 12 through the CS access cell 30, the MSC 32, and the T-MME-CS 38. The second segment is a SIP segment that extends between the CMF/RUA 36 and the remote endpoint 16 through the SAE gateway 22, CSCF 24, ICCF 26, and DTF 28, wherein the CSCF 24 invokes the ICCF 26 and the DTF 28.

Notably, the above embodiment injects a significant delay in the bearer path as the bearer path is being transitioned from the SAE gateway 22 to the media gateway 34. In the following embodiment, a media proxy 42 is provided in the IMS 18 and is closely associated with the DTF 28. As illustrated in FIG. 5, when the user element 12 is served by the PS, the bearer path between the user element 12 and the remote endpoint 16 extends through the PS access cell 20, the SAE gateway 22, and the media proxy 42. The session signaling path remains the same as that of the above embodiment, and as such, extends between the user element 12 and the remote endpoint 16 through the PS access cell 20, SAE gateway 22, CSCF 24, ICCF 26, and DTF 28, wherein the CSCF 24 invoke the ICCF 26 and the DTF 28. When the user element 12 is supported in the CS, the bearer path again moves from the SAE gateway 22 to the media gateway 34; however, as illustrated in FIG. 6, the bearer path remains anchored in the media proxy 42. As such, the bearer path between the user element 12 and the remote endpoint 16 extends through the CS access cell 30, the MSC 32, the media gateway 34, and the media proxy 42. The session signaling path between the user element 12 and the remote endpoint 16 remains the same as that in the above embodiment, and as such, the session signaling path between the user element 12 and the remote endpoint 16 extends through the CS access cell 30, MSC 32, MME-CS 38, CAAF/RUA 36, SAE gateway 22, CSCF 24, ICCF 26, and DTF 28, wherein the ICCF 26 and the DTF 28 are invoked by the CSCF 24.

For inter-subsystem transfers, the MME 40, MME-CS 38, and CAAF/RUA 36 operate as described above to provide the radio layer handover. For the application layer transfer, the DTF 28 controls the media proxy 42 in a manner configured to reduce the length of the interruption of the bearer path as the inter-subsystem transfers occur. In particular, the bearer path in the transferring-out subsystem remains intact as a new bearer path is being established in the transferring-in subsystem. For an inter-subsystem transfer from the PS to the CS, the bearer path to the user element 12 through the PS access cell 20 will remain intact while a new bearer path is being established through the CS access cell 30, and in fact, will remain intact after the new bearer path through the CS access cell 30 is established. For this embodiment, the DTF 28 will instruct the media proxy 42 to send downlink traffic toward the user element 12 over the bearer path through the PS access cell 20, as well as over the bearer path through the CS access cell 30. As such, downlink traffic is immediately available in the bearer path provided through the CS access cell 30 when the user element 12 completes its radio layer handover from the PS access cell 20 to the CS access cell 30.

With the previous embodiment, the user element 12 transitions to the CS access cell 30 well before the bearer path is transitioned from the SAE gateway 22 to the media gateway 34. As such, downlink traffic is not available to the media gateway 34 for delivery to the user element 12 until the remote endpoint 16 is instructed to deliver downlink traffic to the media gateway 34 instead of to the SAE gateway 22. With the current embodiment, the remote endpoint 16 will always send downlink traffic to the media proxy 42, which will provide the downlink traffic over the old and new bearer paths to the user element 12, in order to reduce any interruption in the bearer path during an inter-subsystem transfer. Further, the user element 12 may deliver uplink traffic over the new bearer path established in the transferring-in subsystem toward the remote endpoint 16 through the media proxy 42. When the uplink traffic is received at the media proxy 42 over the bearer path through the transferring-in subsystem, the media proxy 42 can stop sending downlink traffic over the old bearer path through the transferring-out subsystem and update the uplink traffic toward the remote endpoint 16 to use the bearer path through the transferring-in subsystem.

With reference to FIGS. 7A through 7D, a communication flow is provided to illustrate a PS-to-CS inter-subsystem transfer according to an embodiment of the present invention that employs the media proxy 42 to anchor the bearer path. Initially, assume that a PS bearer path is established between the user element 12 and the remote endpoint 16 through the PS access cell 20, the SAE gateway 22, and the media proxy 42 (step 200). Further assume that a session signaling path is established between the user element 12 and the remote endpoint 16, and extends through the PS access cell 20, SAE gateway 22, CSCF 24, ICCF 26, and DTF 28, wherein the CSCF 24 invokes both the ICCF 26 and the DTF 28 (step 202). At this point, the session signaling path is a SIP signaling path from the user element 12 to the remote endpoint 16. As such, a communication session is provided between the user element 12 and the remote endpoint 16, wherein the user element 12 is served by the PS access cell 20 in the PS.

At some point, the user element 12 will determine that there is a need to transfer from the currently serving PS access cell 20 to the CS access cell 30. In this example, the PS access cell 20 is a fourth generation (4G) PS access cell, wherein the CS access cell 30 is a third generation (3G) CS access cell. While the PS access cell 20 is serving the user element 12, signal strength measurements associated with the serving cell are compared to those associated with adjacent cells in the same or different subsystem (step 204). The adjacent cells are potential target cells, and in this example, will include the CS access cell 30. When conditions dictate a handover from the PS access cell 20 to the CS access cell 30, the PS access cell 20 will initiate a handover (step 206) and send a Handover Required message toward the MME 40, which is designated as a source MME (S-MME) (step 208). The target for the Handover Required message corresponds to the MME-CS 38, which is designated as a target MME-CS (T-MME-CS). From the perspective of the S-MME 40, the T-MME-CS 38 appears as a target MME within the PS, and as such, the S-MME 40 will initiate what it believes is a PS-to-PS handover (step 210) by sending a Relocation Request toward the T-MME-CS 38 (step 212). The T-MME-CS 38 will send a Prepare Handover Request to the MSC 32 that supports the CS access cell 30 (step 214). The MSC 32 will act to establish radio resources in the CS access cell 30 by sending a Handover Request to the CS access cell 30 (step 216), which will establish resources for the handover (step 218) and provide an Acknowledgment (ACK) back to the MSC 32 (step 220).

Upon receipt of the Acknowledgement, the MSC 32 will send a Prepare Handover Response to the T-MME-CS 38 to indicate that the radio resources have been established in the CS access cell 30 (step 222). The T-MME-CS 38 will send an Integrated Services User Part (ISUP) Initial Address Message (IAM) to the MSC 32 (step 224) to set up a circuit-switched bearer path between the media gateway 34, which is associated with the T-MME-CS 38, and the MSC 32. The MSC 32 will respond to the IAM with an ISUP Address Complete Message (ACM) (step 226) to indicate that the CS bearer path is being established. The T-MME-CS 38 will then update the signaling context for the session at the SAE gateway 22 to indicate that the session signaling is being transferred from the user element 12 to the CAAF/RUA 36 (step 228). At this point, the portion of the ICCC between the user element 12 and the T-MME-CS 38 is not available. As such, the T-MME-CS 38 will queue the downlink session signaling (step 230) until the ICCC can be established to the user element 12. The T-MME-CS 38 will then initiate preparation of the remote end for the handover (step 232) by sending a message to the CMF/RUA 36 to prepare the remote end for the handover (step 234). At this point, the CMF/RUA 36 may register with the CSCF 24 on behalf of the user element 12 by sending a register message to the CSCF 24 (step 236). The CSCF 24 will respond by providing a 200 OK message (step 238).

After registration, the CMF/RUA 36 will send an Invite into the IMS 18 toward the CSCF 24 to initiate a session signaling transfer from the user element 12 to the CMF/RUA 36 (step 240). The Invite will include the CS communication information for the media gateway 34. In this embodiment, the SAE gateway 22 will remain in the session signaling path after the inter-subsystem transfer; however, the CAAF/RUA 36 will act as an RUA on behalf of the user element 12 with respect to the IMS 18. The DTF 28 will then initiate a transfer of the session signaling from the PS to the CS by directing session signaling toward the CMF/RUA 36 instead of toward the user element 12. The CSCF 24 will forward the Invite to the ICCF 26 (step 242), which will have access to the state information for the communication information because the session signaling is anchored at the ICCF 26. As such, the ICCF 26 can update the Invite with any necessary service state information (step 244) and forward the Invite back to the CSCF 24 for further processing (step 246). The CSCF 24 will then forward the Invite to the DTF 28, which also provides an anchor for the session signaling (step 248). The DTF 28 will initiate a PS-to-CS bearer and session signaling transfer toward the remote endpoint 16 (step 250).

In this embodiment, there is no need for the DTF 28 to instruct the remote endpoint 16 to redirect traffic from the SAE gateway 22 to the media gateway 34. Instead, the remote endpoint 16 will continue to deliver downlink traffic toward the media proxy 42 and receive uplink traffic from the media proxy 42. As such, the remote endpoint 16 need not be aware of the change in the bearer path across the inter-subsystem transfer. Accordingly, the DTF 28 will send a message to initiate a bi-cast of downlink traffic over the old bearer path to the user element 12 through the SAE gateway 22, as well as over a new bearer path through the media gateway 34 (step 252). The DTF 28 may obtain the CS communication information necessary to deliver downlink traffic to the media gateway 34 from the Invite. In response, the media proxy 42 will provide a downlink traffic bi-cast, wherein downlink traffic is delivered over the old (transferring-out) and new (transferring-in) bearer paths toward the user element 12 (step 254). The media proxy 42 will also begin monitoring for uplink traffic via the new CS bearer path.

At this point, the new bearer path extends between the CS access cell 30 and the remote endpoint 16 through the MSC 32, media gateway 34, and media proxy 42 (step 256). Notably, the new bearer path is only carrying downlink traffic toward the CS access cell 30 at this point. However, the old bearer path facilitates bidirectional communications between the user element 12 and the remote endpoint 16 via the media proxy 42. Further, the portion of the bearer path between the media proxy 42 and the remote endpoint 16 is common to the old and new bearer paths.

Meanwhile, the radio layer handover is taking place. At this point, the T-MME-CS 38 will send a Relocation Response to the S-MME 40 to instruct the user element 12 to effect the radio layer handover (step 258). As such, the S-MME 40 will send a Handover Required message to the PS access cell 20 (step 260), which will send a Handover Command to the user element 12 (step 262). The user element 12 will then retune itself to effectively change from a channel within the PS access cell 20 to a channel for the CS access cell 30 (step 264). During this process, the CS access cell 30 will detect the presence of the user element 12 (step 266) and send a Handover Detect message toward the MSC 32 to indicate that the user element 12 has switched to the CS access cell 30 (step 268). The MSC 32 will send the Handover Detect message to the T-MME-CS 38 (step 270), which will send the Handover Detect message to the CMF/RUA 36 to indicate that the user element 12 is now being served by the CS access cell 30 (step 272).

In the meantime, the CS access cell 30 may generate a Handover Complete message, which is sent to the MSC 32 to indicate that the handover is fully transitioned to the CS access cell 30 from the perspective of the user element 12 (step 274). The MSC 32 will send the Handover Complete message to the T-MME-CS 38 (step 276), and subsequently send an ISUP Answer Message to instruct the T-MME-CS 38 (step 278) to complete the bearer path between the media gateway 34 and the remote endpoint 16, as well as to the user element 12 via the MSC 32.

At this point, the new (transferring-in) bearer path is established in the CS between the user element 12 and the remote endpoint 16 through the CS access cell 30, MSC 32, media gateway 34, and media proxy 42 (step 280). When the user element 12 is capable of sending uplink traffic over the new bearer path toward the remote endpoint 16, it will do so. Upon receiving the first uplink traffic, the media proxy 42 will switch completely from the old (PS) bearer path to the new (CS) bearer path (step 282). The DTF 28 may be informed of the switch by the media proxy 42 and take the necessary steps to tear down the old bearer path and the old session signaling path. As in the first embodiment, the session signaling (step 284) comprises two primary segments. The first segment is the ICCC, which extends between the CAAF/RUA 36 and the user element 12 through the CS access cell 30, the MSC 32, and the T-MME-CS 38. The second segment is a SIP segment that extends between the CAAF/RUA 36 and the remote endpoint 16 through the SAE gateway 22, CSCF 24, ICCF 26, and DTF 28, wherein the CSCF 24 invokes the ICCF 26 and the DTF 28.

With the above embodiment, the use of the media proxy 42 reduces any interruption in the bearer path associated with transferring between the CS and the PS. Notably, the media proxy 42 does not need to be invoked in the bearer path at all times. The DTF 28 may selectively invoke the media proxy 42 when inter-subsystem transfers are likely. Notably, the media proxy 42 may be invoked and left in the bearer path for the remainder of the communication session, or may be selectively invoked as is deemed appropriate, for this alternative embodiment.

With reference to FIGS. 8A through 8C, a communication flow is provided to illustrate an inter-subsystem transfer from the CS back to the PS, and in particular from the CS access cell 30 to the PS access cell 20. This inter-subsystem handover corresponds to the embodiment of FIGS. 1 through 3, wherein session signaling is routed through the SAE gateway 22 for PS and CS access. Initially, assume the user element 12 is being served by the CS access cell 30 and is engaged in a communication session with the remote endpoint 16. As such, the bearer path of the user element 12 as served by the CS extends between the user element 12 and the remote endpoint 16 through the CS access cell 30, MSC 32, and media gateway 34 (step 300). The session signaling (step 302) comprises two primary segments. The first segment is the ICCC, which extends between the CAAF/RUA 36 and the user element 12 through the CS access cell 30, the MSC 32, and the T-MME-CS 38. The second segment is a SIP segment that extends between the CAAF/RUA 36 and the remote endpoint 16 through the SAE gateway 22, CSCF 24, ICCF 26, and DTF 28, wherein the CSCF 24 invokes the ICCF 26 and the DTF 28.

While the CS access cell 20 is serving the user element 12, signal strength measurements associated with the serving cell are compared to those associated with adjacent cells in the same or different subsystem (step 304). The adjacent cells are potential target cells, and in this example, will include the PS access cell 20. When conditions dictate a handover from the CS access cell 30 to the PS access cell 20, the PS access cell 20 will initiate a handover (step 306) and send a Handover Required message to the associated MSC 32 (step 308). In this example, the CS access cell 30 is the source access cell, and the PS access cell 20 is the target access cell. Accordingly, the MME 40 that is associated with the PS access cell 20 will be referred to as a target MME (T-MME) 40. Similarly, the MME-CS 38 that is associated with the CS access cell 30 is a source MME-CS (S-MME-CS) 38.

Once the MSC 32 receives the Handover Required message from the CS access cell 30, a Prepare Handover Request is sent to the S-MME-CS 38 (step 310), which will send a Relocation Request to the T-MME 40 (step 312). Again, the S-MME-CS 38 appears as a source MME to the T-MME 40.

Further, the S-MME-CS 38 may appear as a target MSC to the MSC 32. Accordingly, the T-MME 40 will send a Handover Request to the PS access cell 20 to establish resources in the PS access cell 20 for the handover (step 314). The PS access cell 20 will then establish resources for the handover (step 316) and provide an Acknowledgement to the Handover Request back to the T-MME 40 (step 318). The T-MME 40 will then update the signaling context at the SAE gateway 22 to indicate that a handover is taking place into the PS access cell 20 through the T-MME 40 (step 320). The T-MME 40 will also send a Relocation Response back to the S-MME-CS 38 to indicate that resources for the handover have been established in the PS access cell 20 (step 322). The S-MME-CS 38 will provide a Prepare Handover Response back to the MSC 32 (step 324). Once the MSC 32 recognizes that the resources for the handover are available in the PS access cell 20, a Handover Command is sent to the CS access cell 30 (step 326), which will send a Handover Command to the user element 12 (step 328). The Handover Command provides an instruction for the user element 12 to change from a channel in the CS access cell 30 to a channel in the PS access cell 20 to effect a transition from the CS to the PS (step 330).

The PS access cell 20 will detect the presence of the user element 12 in the PS (step 332), and will send a Handover Complete message to the T-MME 40 (step 334). The T-MME 40 will send a Relocation Complete message to the S-MME-CS 38 to indicate that the user element 12 has transitioned from the CS to the PS (step 336). The S-MME-CS 38 will send an Update Context message to inform the SAE gateway 22 that the handover is complete, and in particular, to provide information assisting the SAE gateway 22 in delivering the bearer and session signaling to the user element 12 instead of to the media gateway 34 and the CAAF/RUA 36, respectively (step 338). The S-MME-CS 38 will send a Relocation Complete Acknowledgement back to the T-MME 40 (step 340), as well as send a Handover Complete message to the MSC 32 (step 342). The Handover Complete message informs the MSC 32 that the handover is complete. The MSC 32 will then take the necessary steps to release the bearer path extending to the user element 12 through the CS access cell 30 upon receiving a Release instruction from the S-MME-CS 38 (step 344).

When the user element 12 transitions to the PS access cell 20, the user element 12 will register with the IMS 18, perhaps by sending a Register message to the CSCF 24 (step 346). The Register message may provide updated contact or address information for the user element 12 as the user element 12 is being served in the PS. Prior to the handover, the CAAF/RUA 36 was registered on behalf of the user element 12. As such, the user element 12 is registered directly with the IMS 18 instead of indirectly via the CMF/RUA 36. The CSCF 24 will send a 200 OK message back to the user element 12 in response to the Register message (step 348).

Next, the user element 12 will initiate a communication session from the CMF/RUA 36 to the user element 12 by sending an Invite indicating the same into the IMS 18. The Invite will also include the PS communication information necessary to deliver packet traffic to the user element 12. The Invite is received at the CSCF 24 in the IMS 18 (step 350), and is routed through the ICCF 26 (step 352) to update the service state (step 354). Notably, the user element 12 may not be aware of the service state, because the CAAF/RUA 36 was acting on behalf of the user element 12 prior to the handover into the PS. Since the ICCF 26 maintains service state information and is an anchor point for session signaling, the service state may be maintained at the ICCF 26 and updated as necessary after an inter-subsystem transfer.

After the service state update, the ICCF 26 will send an Invite with updated service state information back to the CSCF 24 (step 356), which will forward the Invite to the DTF 28 (step 358). The DTF 28 will initiate the CS-to-PS handover (step 360), and in particular will send information to the remote endpoint 16 to indicate the transfer of the communication session from the CAAF/RUA to the user element 12. Accordingly, the DTF 28 will send a Re-Invite including the PS communication information for the user element 12 toward the remote endpoint 16 through the CSCF 24 (steps 362 and 364). Although not illustrated, a 200 OK message in response to the Re-Invite may be passed along the session signaling path to the user element 12. The 200 OK message may include PS communication information for the remote endpoint 16 or a remote user agent acting on behalf of the remote endpoint 16. At this point, the bearer path is established between the user element 12 and the remote endpoint 16 through the PS access cell 20 and the SAE gateway 22 (step 366). The session signaling path is established between the user element 12 and the remote endpoint 16, and extends through the PS access cell 20, SAE gateway 22, CSCF 24, ICCF 26, and DTF 28, wherein the CSCF 24 invokes both the ICCF 26 and the DTF 28 (step 368).

In the above embodiment, the CAAF/RUA 36 provides a stateless RUA on behalf of the user element 12 to the IMS 18. Further, the ICCF 26 provides a stateful RUA on behalf of the user element 12 to the IMS 18. The stateful and stateless RUAs are presented to the IMS 18 when the user element 12 is served by the CS. Notably, a stateless RUA does not have access to the service state for the communication session after an inter-subsystem transfer, whereas a stateful RUA will have service state information after an inter-subsystem transfer. As such, the CAAF/RUA 36 and the ICCF 26 effectively provide a bifurcated RUA, wherein one portion resides in the CS and the other resides in the IMS 18.

With reference to FIG. 9, in another embodiment of the present invention the functionality of the CAAF/RUA 36 is integrated into the functionality of the ICCF 26. As such, there is not a bifurcated RUA, and the MME-CS 38 is configured to extend the ICCC to the ICCF 26 via the SAE gateway 22 and the CSCF 24. Additionally, the media gateway 34 that was associated with the MME-CS 38 is eliminated and replaced with a media gateway 44, which resides in the IMS 18. The media gateway 44 is controlled by a media gateway control function (MGCF) 46 that resides in the IMS 18 and provides interworking between the CS and IMS 18. Notably, the ICCF 26 may also interact with the MGCF 46 to facilitate bearer control through the media gateway 44. Further, a media gateway 48 is provided in close association with the DTF 28, and will act in a similar fashion to the media proxy 42, which was described above. During an inter-subsystem transfer, downlink traffic may be bi-cast over the transferring-in and transferring-out bearer paths to minimize bearer interruption as the user element 12 transitions from the transferring-out subsystem to the transferring-in subsystem.

As depicted in FIG. 9, when the user element 12 is served by the PS, the bearer path is a PS bearer path, and extends between the user element 12 and the remote endpoint 16 through the PS access cell 20, SAE gateway 22, and media gateway 48. The session signaling path between the user element 12 and the remote endpoint 16 extends through the PS access cell 20, SAE gateway 22, and CSCF 24, which will invoke the ICCF 26 and DTF 28.

With reference to FIG. 10, the bearer and session signaling paths are illustrated for a scenario where the user element 12 is supported by the CS. The bearer path between the user element 12 and the remote endpoint 16 extends through the CS access cell 30, the MSC 32, the media gateway 44, and the media gateway 48, which is associated with the DTF 28. The bearer path between the user element 12 and the media gateway 44 is circuit-switched, while the bearer path between the media gateway 44 and the remote endpoint 16 may be packet-based. The session signaling between the user element 12 and the remote endpoint 16 extends through the CS access cell 30, the MSC 32, the MME-CS 38, the SAE gateway 22, and the CSCF 24, which will invoke the ICCF 26 and the DTF 28. CS call control may be provided between the ICCF 26 and the MGCF 46 through the CSCF 24. Further, the MGCF 46 may interwork with the MSC 32 or other entities in the CS to facilitate bearer control. Operational details are provided further below.

FIG. 11 illustrates the various handover control signaling paths. Notably, the MME-CS 38 is able to communicate effectively with the ICCF 26, preferably through the SAE gateway 22 and the CSCF 24. As such, the ICCF 26 may provide handover control in the CS from the IMS 18.

With reference to FIGS. 12A through 12D, a communication flow is provided to illustrate an inter-subsystem transfer from the PS access cell 20 to the CS access cell 30. The bearer and session signaling paths are depicted as described immediately above (steps 400 and 402). Notably, the media gateway 48, which is associated with the DTF 28, resides in the bearer path between the user element 12 and the remote endpoint 16. While the PS access cell 20 is serving the user element 12, signal strength measurements associated with the serving cell are compared to those associated with adjacent cells in the same or different subsystem (step 404). The adjacent cells are potential target cells, and in this example, will include the CS access cell 30. When conditions dictate a handover from the PS access cell 20 to the CS access cell 30, the PS access cell 20 will initiate a handover (step 406) and send a Handover Required message toward the MME 40, which is designated as a source MME (S-MME) (step 408). The target for the Handover Required message corresponds to the MME-CS 38, which is designated as a target MME-CS (T-MME-CS). From the perspective of the S-MME 40, the T-MME-CS 38 appears as a target MME within the PS, and as such, the S-MME 40 will initiate what it believes is a PS-to-PS handover (step 410) by sending a Relocation Request toward the T-MME-CS 38 (step 412). The T-MME-CS 38 will send a Prepare Handover Request to the MSC 32 that supports the CS access cell 30 (step 414). The MSC 32 will act to establish radio resources in the CS access cell 30 by sending a Handover Request to the CS access cell 30 (step 416), which will establish resources for the handover (step 418) and provide an Acknowledgment back to the MSC 32 (step 420).

Once the MSC 32 receives an indication that resources have been established for the handover at the CS access cell 30, the MSC 32 will send a Prepare Handover Response back to the T-MME-CS 38 (step 422). Notably, the Prepare Handover Response will include a handover number that is associated with the MSC 32. The T-MME-CS 38 will use the handover number to trigger the ICCF 26 to establish a circuit-switched connection for a portion of the CS bearer path between the media gateway 44 and the MSC 32. To accomplish this, the T-MME-CS 38 may send an Invite that may include a Handover Request with the handover number toward the ICCF 26 through the CSCF 24 (steps 424 and 426). The ICCF 26 may update service state information (step 428) and proceed to initiate the portion of the bearer path between the media gateway 44 and the MSC 32. As such, an Invite with the handover number is generated and sent toward the MGCF 46, which is associated with the media gateway 44 (step 430). The MGCF 46 will initiate an ISUP IAM toward the handover number, and thus towards the MSC 32 (step 432). The MSC 32 will recognize that an incoming call from the media gateway 34 is being received, and will begin establishing a connection with the media gateway 44. Further, the MSC 32 will send an ISUP ACM to the MGCF 46 (step 434) to indicate that the call is progressing. The MGCF 46 will send a Ringing message back toward the ICCF 26 (step 436). Notably, communications between the MGCF 46 and the ICCF 26 may be direct or indirect via the CSCF 24. Although a handover number and an Invite are disclosed, those skilled in the art will recognize other techniques for initiating the circuit-switched connections.

At this point, the ICCF 26 may respond to the original Invite (of step 426) by forwarding the Invite back to the CSCF 24 (step 438), which will forward the Invite to the DTF 28 (step 440). As described above, the DTF 28 will initiate a PS-to-CS transfer of the session signaling (step 442), and initiate a bi-cast over the transferring-out and transferring-in bearer paths toward the user element 12 via the PS and CS, respectively. As such, the DTF 28 may send a message to initiate the bi-cast to the media gateway 48, which is associated with the DTF 28 (step 444). The media gateway 48 will provide a downlink traffic bi-cast over the transferring-out and transferring-in bearer paths, and then begin to monitor for uplink traffic via the CS bearer path (step 446). The media gateway 48 may acknowledge initiation of the bi-cast (step 448), wherein the DTF 28 may initiate a 200 OK message back toward the T-MME-CS 38. The 200 OK message is received by the CSCF 24 (step 450), which will route the 200 OK message through the ICCF 26 and then toward the T-MME-CS 38 (steps 452-456).

Next, the T-MME-CS 38 may update the signaling context at the SAE gateway 22 to indicate that the session signaling is moving from the user element 12 to the T-MME-CS 38 (step 458). Next, the T-MME-CS 38 will being queuing the downlink session signaling until such signaling can be delivered to the user element 12 over the ICCC (step 460). At this point, the original bearer path (of step 400) is capable of bidirectional communications between the user element 12 and the remote endpoint 16. This bearer path is the transferring-out bearer path. The transferring-in bearer path has been established based on the above signaling between the CS access cell 30 and the remote endpoint 16 through the MSC 32, media gateway 44, and media gateway 48 (step 462). Notably, the portion of the bearer path between the media gateway 48 and the remote endpoint 16 supports both the transferring-out and the transferring-in bearer paths. Further, only downlink traffic is provided from the media gateway 48 to the CS access cell 30 over the transferring-in bearer path until the user element 12 is able to successfully transition, at the radio layer, to the CS access cell 30 from the PS access cell 20.

At this point, the T-MME-CS 38 will respond to the Relocation Request (of step 412) with a Relocation Response directed toward the S-MME 40 (step 464). The S-MME 40 will send a Handover Required Acknowledgement to the PS access cell 20 (step 466), which will generate a Handover Command and send it toward the user element 12 (step 468). The user element 12 will then change channels to effect a radio layer handover from the PS access cell 20 to the CS access cell 30 (step 470). The CS access cell 30 may be able to detect the presence of the user element 12 (step 472), and will send a Handover Complete message to the MSC 32 (step 474). The MSC 32 will inform the T-MME-CS 38 that the handover is complete (step 476), and send an Answer message back to the MGCF 46 to complete the ISUP signaling for the bearer path established between the media gateway 44 and the MSC 32 (step 478). The MGCF 46 will then send a 200 OK message back toward the ICCF 26 in response to the Invite of step 430 (step 480).

When the media gateway 48 detects uplink traffic from the user element 12 via the transferring-in bearer path in the CS, the bi-cast will end, such that downlink traffic is only delivered over the transferring-in bearer path. The DTF 28 may take the necessary steps to end any session signaling legs or bearer portions extending toward the user element 12 via the PS. The resultant transferring-in bearer path extends between the user element 12 and the remote endpoint 16 via the CS access cell 30, MSC 32, media gateway 44, and media gateway 48 (step 482). The session signaling extends between the user element 12 and the remote endpoint 16 through the CS access cell 30, the MSC 32, the T-MME-CS 38, the SAE gateway 22, and the CSCF 24, which will invoke the ICCF 26 and the DTF 28 (step 484). Notably, the ICCC portion of the session signaling path extends between the user element 12 and the ICCF 26. The T-MME-CS 38 may provide interworking between session messages of the CS and SIP or like messages of the IMS 18. Again, the ICCF 26 provides a remote user agent for the user element 12 into the IMS 18.

From the above, those skilled in the art will recognize various alternatives to the specific call flows provided to implement the concepts of the present invention. Further, the various functions may be provided in the same or separate service nodes in the various subsystems. For example, the ICCF 26 and DTF 28 may be provided in the same or different service nodes. Further, the CMF/RUA 36 and the MME-CS 38 may be provided in the same or different service nodes, and may also be associated with an imbedded media gateway control function to facilitate control of the associated media gateway 34. Also, the entities and functions illustrated may be supported by other networks and network nodes that are capable of handling and providing various messaging processing therebetween. The communication flows are logical in nature, and will vary from one implementation to another. Although the scenarios provided above relate to inter-subsystem transfers between a 4G PS access network and a 3G CS access network, other generations of networks and corresponding access cells are supported by the present invention.

The ICCF 26 and DTF 28 may employ back-to-back user agents as well as third party call control functionality to anchor session signaling and allow signaling access legs toward the user element 12 to move from one subsystem to another without impacting a remote access signaling leg toward the remote endpoint 16. The ICCF 26 and DTF 28 may be addressable using public service identities (PSI) from the CS and PS domains 14. In the CS, a directory number associated with the respective functions may be used for routing signaling messages within the CS. In the PS or the IMS 18, a uniform resource locator (URL) associated with the particular function may be used for routing signaling messages. For additional information relating to session continuity and alternative handover techniques, reference is made to U.S. patent application Ser. No. 11/378,776 filed Mar. 17, 2006; U.S. patent application Ser. No. 11/440,165 filed May 24, 2006; U.S. patent application Ser. No. 11/452,069 filed Jun. 12, 2006; U.S. patent application Ser. No. 11/451,722 filed Jun. 13, 2006; U.S. patent application Ser. No. 11/466,115 filed Aug. 22, 2006; and U.S. patent application Ser. No. 11/554,930 filed Oct. 31, 2006; and International Application serial number PCT/IB2007/001555 entitled METHOD FOR TRANSITIONING SUPPORT OF COMMUNICATION SESSIONS FOR A USER ELEMENT BETWEEN DIFFERENT TYPES OF SUBSYSTEMS OF DIFFERENT GEN- ERATIONS and filed concurrently herewith, which are incorporated herein by reference in their entireties.

As noted, the present invention supports different generations of access technology. Each generation is an evolutionary generation of wireless communication infrastructures and communication standards. Second generation (2G), third generation (3G), and fourth generation (4G) communication systems are referenced herein. 2G standards are digital in nature and rely primarily on a CS domain for voice and data. Select 2G systems include but are not limited to Global System for Mobile Communications (GSM), Digital Advanced Mobile Phone System (D-AMPS), Interim Standard 95 (IS-95) (Code Division Multiple Access—CDMA), General Packet Radio Service (GPRS), and CDMA2000 (1xRTT/IS-2000). 3G standards are digital in nature and employ a PS domain in parallel with a CS domain to provided increased data rates over 2G systems. Select 3G systems include but are not limited to Enhanced Data Rates for GSM Evolution (EDGE), Enhanced GPRS (EGPRS), Wideband CDMA (W-CDMA), and Universal Mobile Telecommunications System (UMTS) (Third Generation GSM-3GSM), 1x Evolution-Data Only (1x-DO)/IS-856, and Time Division-Synchronous Code Division Multiple Access (TD-SCDMA). 4G standards are digital in nature and will generally rely on a PS domain for voice and data. In most systems, no CS domain is necessary. 4G systems include, but are not limited to Worldwide Interoperability for Microwave Access (WiMax), Wireless Metropolitan Area Network (WirelessMAN), IEEE802.16, and the proposed Third Generation Partnership Project (3GPP) Long Term Evolution work-in-progress technologies, such as enhanced UMTS and W-CDMA.

With reference to FIG. 13, a service node 50 is provided according to one embodiment of the present invention. The service node 50 may reside in the home IMS 18 or visited PS and CS domains 14 and includes a control system 52 and associated memory 54 to provide the functionality for any one or a combination of the following: the MME-CS 38, MME 40, CAAF/RUA 36, CSCF 24, ICCF 26, and DTF, 28. The control system 48 will also be associated with a communication interface 56 to facilitate communications as described above based on the functions being implemented.

With reference to FIG. 14, a block representation of a user element 12 is provided. The user element 12 may include a control system 58 having sufficient memory 60 to support operation of a CS client 62 and an MS client 64, which support CS and PS access and communications, respectively. The control system 58 will cooperate closely with a communication interface 66 to allow the CS client 62 and the MS client 64 to facilitate communications over a CS or the PS (IMS) as described above. The control system 58 may also be associated with a user interface 68, which will facilitate interaction with the user. The user interface 68 may include a microphone and speaker to facilitate voice communications with the user, as well as a keypad and display to allow the user to input and view information to support media sessions and control of the user element 12.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
    anchoring, at a first function in a multimedia subsystem, session signaling for a communication session established between a user element and a remote endpoint;
    providing, from the multimedia subsystem, centralized service control for the communication session, wherein the centralized service control is provided when the user element is served by a circuit-switched subsystem and when the user element is served by a packet subsystem;
    during the communication session, effecting a radio layer handover of the user element from a transferring-out subsystem to a transferring-in subsystem, wherein the transferring-out subsystem is the packet subsystem, wherein the transferring-in subsystem is the circuit-switched subsystem, and wherein the centralized service control is maintained across the radio layer handover; and
    wherein the radio layer handover includes representing a handover function as a target mobility management entity (MME) to the transferring-out subsystem and the handover function as a source mobile switching center (MSC) to the transferring-in subsystem.

2. The method of claim 1 wherein the first function is a domain transfer function in the multimedia subsystem, wherein a session signaling path extends to the user element through a control channel in the circuit switched subsystem when the user element is served by the circuit-switched subsystem, and extends to the user element through the packet subsystem when the user element is served by the packet subsystem.

3. The method of claim 2 wherein:
    a stateless remote user agent function is provided in the session signaling path in the circuit-switched subsystem and a stateful remote user agent function is provided in the session signaling path at the first function;
    the stateless remote user agent and the stateful remote user agent represent the user element to the multimedia subsystem when the user element is served by the circuit-switched subsystem; and
    the stateful remote user agent maintains service state information in the session signaling for the communication session across the radio layer handover.

4. The method of claim 2 wherein a stateful remote user agent function is provided in the session signaling path at the first function and maintains service state information in the session signaling for the communication session across the radio layer handover.

5. The method of claim 4 wherein the stateful remote user agent is the only remote user agent provided to represent the user element to the multimedia subsystem.

6. The method of claim 1 wherein the first function is a circuit-switched control function in the multimedia subsystem.

7. The method of claim 1 wherein the radio layer hand over of the user element from the transferring-out subsystem to the transferring-in subsystem is effected before a bearer path in the transferring-in subsystem is established to a target access cell in the transferring-in subsystem.

8. The method of claim 1 further comprising delivering downlink traffic toward the user element over a first bearer path in the transferring-out subsystem and over a second bearer path in the transferring-in subsystem toward the user element in association with the radio layer handover, wherein the radio layer handover of the user element from the transferring-out subsystem to the transferring-in subsystem is effected after the second bearer path in the transferring-in subsystem is established to a target access cell in the transferring-in subsystem.

9. The method of claim 8 wherein delivery of the downlink traffic toward the user element over the first bearer path is stopped upon receiving uplink traffic from the user element over the second bearer path.

10. The method of claim 1 further comprising providing session updates toward the remote endpoint in association with the radio layer handover, wherein the session updates present communication information bearing on at least one of a group consisting of an address to which to direct bearer traffic and communication information associated with delivering the bearer traffic.

11. The method of claim 1 wherein effecting the radio layer handover comprises providing control of the radio layer hand over from the multimedia subsystem.

12. The method of claim 1 wherein the session signaling is anchored at a first function in the multimedia subsystem and a session signaling path extends to the user element in the circuit-switched subsystem when the user element is served by the circuit-switched subsystem, wherein the handover function is provided in the session signaling path.

13. The method of claim 12 wherein a remote user agent representing the user element to the multimedia subsystem is provided in the session signaling path when the user element is served by the circuit-switched subsystem.

14. The method of claim 12 wherein the session signaling path extends through a gateway interworking the multimedia subsystem with the packet subsystem, and further comprising providing a context update by the handover function to the gateway to inform the gateway of a transition of the communication session from the transferring-out subsystem to the transferring-in subsystem.

15. The method of claim 1 further comprising:
queuing session downlink signaling associated with a bearer path being established in the circuit-switched subsystem at the hand over function until the user element transitions to the transferring-in subsystem.

16. The method of claim 1 wherein the radio layer hand over transfers wireless communication access from a source cell in the transferring-out subsystem to a target cell in the transferring-in subsystem, wherein the source cell supports wireless communications using one generation of wireless access technology and the target cell supports wireless communications using another generation of the wireless access technology.

17. The method of claim 1 wherein the packet subsystem supports Fourth Generation (4G) wireless access technology and the circuit-switched subsystem supports one of First, Second, and Third Generation (1X, 2G, 3G) wireless access technologies.

18. A system, comprising:
at least one communication interface; and
a control system associated with the at least one communication interface;
a handover node;
wherein the control system is configured to:
anchor, at a first function in a multimedia subsystem, session signaling for a communication session established between a user element and a remote endpoint;
provide, from the multimedia subsystem, centralized service control for the communication session, wherein the centralized service control is provided when the user element is served by a circuit-switched subsystem and when the user element is served by a packet subsystem, wherein during the communication session, the centralized service control is maintained across a the radio layer handover of the user element from a transferring-out subsystem to a transferring-in subsystem, wherein the transferring-out subsystem is the packet subsystem, wherein the transferring-in subsystem is the circuit-switched subsystem;
wherein the handover node is configured to effect the radio layer handover including:
representing a target mobility management entity (MME) to the transferring-out subsystem; and
representing a source mobile switching center (MSC) to the transferring-in subsystem.

19. The system of claim 18 wherein the first function is a domain transfer function, wherein a session signaling path extends to the user element through a control channel in the circuit-switched subsystem when the user element is served by the circuit-switched subsystem and extends to the user element through the packet subsystem when the user element is served by the packet subsystem.

20. The system of claim 19 wherein:
a stateless remote user agent function is provided in the session signaling path in the circuit-switched subsystem and a stateful remote user agent function is provided in the session signaling path by the first function;
the stateless remote user agent and the stateful remote user agent represent the user element to the multimedia subsystem when the user element is served by the circuit-switched subsystem; and
the stateful remote user agent maintains service state information in the session signaling for the communication session across the radio layer handover.

21. The system of claim 19 wherein a stateful remote user agent function is provided in the session signaling path by the first function and maintains service state information in the session signaling for the communication session across the radio layer hand
over.

22. The system of claim 18 wherein the first function is a circuit-switched control function in the multimedia subsystem.

23. The system of claim 18 wherein the radio layer hand over of the user element from the transferring-out subsystem to the transferring-in subsystem is effected before a bearer path in the transferring-in subsystem is established to a target access cell in the transferring-in subsystem.

24. The system of claim 18 further comprising a bi-cast node adapted to deliver downlink traffic toward the user element over a first bearer path in the transferring-out subsystem and over a second bearer path in the transferring-in subsystem toward the user element in association with the radio layer hand over, wherein the radio layer hand over of the user element from the transferring-out subsystem to the transferring-in subsystem is effected after the second bearer path in the transferring-in subsystem is established to a target access cell in the transferring-in subsystem.

25. The system of claim 24 wherein delivery of the downlink traffic toward the user element over the first bearer path is stopped upon receiving uplink traffic from the user element over the second bearer path.

26. The system of claim 18 further comprising a domain transfer function adapted to provide session updates toward the remote endpoint in association with the radio layer handover, wherein the session updates present communication information bearing on at least one of a group consisting of an address to which to direct bearer traffic and communication information associated with delivering the bearer traffic.

27. The system of claim 18 wherein effecting the radio layer hand over comprises providing control of the radio layer hand over from the multimedia subsystem.

28. The system of claim 18 wherein the session signaling is anchored at a first function in the multimedia subsystem and a session signaling path extends to the user element in the circuit-switched subsystem when the user element is served by the circuit-switched subsystem, wherein the handover function is provided in the session signaling path.

29. The system of claim 28 wherein a remote user agent representing the user element to the multimedia subsystem is provided in the session signaling path when the user element is served by the circuit-switched subsystem.

30. The system of claim 18 wherein the handover node is configured to queue session downlink signaling associated with a bearer path being established in the circuit-switched subsystem at the handover function until the user element transitions to the transferring-in subsystem.

31. The system of claim 18 wherein the session signaling path extends through a gateway interworking the multimedia subsystem with the packet subsystem and the hand over node is further configured to provide a context update to the gateway to inform the gateway of a transition of the communication session from the transferring-out subsystem to the transferring-in subsystem.

32. The system of claim 18 wherein the radio layer handover transfers wireless communication access from a source cell in the transferring-out subsystem to a target cell in the transferring-in subsystem, wherein the source cell supports wireless communications using one generation of wireless access technology and the target cell supports wireless communications using another generation of the wireless access technology.

33. The system of claim 18 wherein the packet subsystem supports Fourth Generation (4G) wireless access technology and the circuit-switched subsystem supports one of First, Second, and Third Generation (1X, 2G, 3G) wireless access technologies.

34. The method of claim 1, wherein the representing includes:
   the handover function receiving a relocation request from a source MME; and
   the handover function sending a prepare handover request to a target MSC.

35. The method of claim 34, wherein the source MME perceives the radio layer handover as a packet-subsystem-to-packet-subsystem handover.

36. A method, comprising:
   a user element communicating with a remote endpoint via a communication session, wherein session signaling for the communication session is anchored at a first function in a multimedia subsystem;
   the user element participating in a handover between a circuit-switched subsystem and a packet subsystem, wherein centralized service control for the communication session is provided from the multimedia subsystem when the user element is served by the circuit-switched subsystem and when the user element is served by the packet subsystem; and
   wherein the handover includes a transfer function being represented as a mobility management entity (MME) to the packet subsystem and the function being represented as a mobile switching center (MSC) to the circuit-switched subsystem.

* * * * *